US012704762B2

(12) United States Patent
Sekine et al.

(10) Patent No.: US 12,704,762 B2
(45) Date of Patent: Aug. 11, 2026

(54) LASER AMPLIFICATION DEVICE AND LASER AMPLIFICATION METHOD

(71) Applicant: HAMAMATSU PHOTONICS K.K., Hamamatsu (JP)

(72) Inventors: Takashi Sekine, Hamamatsu (JP); Yoshinori Tamaoki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 303 days.

(21) Appl. No.: 18/681,646

(22) PCT Filed: May 16, 2022

(86) PCT No.: PCT/JP2022/020426

§ 371 (c)(1),
(2) Date: Feb. 6, 2024

(87) PCT Pub. No.: WO2023/032357

PCT Pub. Date: Mar. 9, 2023

(65) Prior Publication Data

US 2024/0361666 A1 Oct. 31, 2024

(30) Foreign Application Priority Data

Sep. 1, 2021 (JP) ................................. 2021-142125

(51) Int. Cl.
*G02F 1/35* (2006.01)
*G02F 1/355* (2006.01)
(Continued)

(52) U.S. Cl.
CPC ............ *G02F 1/354* (2021.01); *G02F 1/3551* (2013.01); *G02F 1/39* (2013.01); *G02F 1/392* (2021.01); *H01S 3/0092* (2013.01); *H01S 3/2391* (2013.01)

(58) Field of Classification Search
CPC .......... G02F 1/354; G02F 1/3551; G02F 1/39; G02F 1/392; H01S 3/0092; H01S 3/2391
See application file for complete search history.

(56) References Cited

U.S. PATENT DOCUMENTS 6,181,463 B1 1/2001 Galvanauskas et al.
8,514,485 B2 * 8/2013 Rothenberg ....... G02B 6/02042 385/38
(Continued)

FOREIGN PATENT DOCUMENTS

CN 104136984 A 11/2014
JP H10-268369 A 10/1998
(Continued)

OTHER PUBLICATIONS

1 Extended European Search Report issued on Apr. 15, 2025 in corresponding European patent application 22863947.2.
(Continued)

*Primary Examiner* — Daniel Petkovsek
(74) *Attorney, Agent, or Firm* — Faegre Drinker Biddle & Reath LLP

(57) ABSTRACT

A laser amplification device includes an amplification unit and a phase adjustment unit; the amplification unit includes a signal light source, an excitation light source, and a nonlinear optical crystal; the nonlinear optical crystal has a plurality of spatially different crystal portions; the signal light source, the excitation light source, and the nonlinear optical crystal are arranged such that signal light and excitation light are simultaneously incident on the plurality of crystal portions and that the elements of at least one of a set of the angles of incidence between the crystal axes of the plurality of crystal portions and the signal light and a set of
(Continued)

the angles of incidence between the crystal axes of the plurality of crystal portions and the excitation light are different.

24 Claims, 21 Drawing Sheets

(51) Int. Cl.
*G02F 1/39* (2006.01)
*H01S 3/00* (2006.01)
*H01S 3/23* (2006.01)

(56) References Cited

U.S. PATENT DOCUMENTS 11,009,773 B2 * 5/2021 Zhong .................... G02F 1/39
11,217,959 B2 * 1/2022 Zhong .................. G02F 1/3558
2005/0128554 A1 * 6/2005 Wickham .............. H01S 3/0057 359/237
2014/0219300 A1 8/2014 Schimidt et al.
2015/0023375 A1 1/2015 Miyanaga et al.

FOREIGN PATENT DOCUMENTS

JP 2013-174812 A 9/2013
JP 2020-112706 A 7/2020
WO WO-2009/093425 A1 7/2009

OTHER PUBLICATIONS

International Preliminary Report on Patentability mailed Mar. 14, 2024 for PCT/JP2022/020426.

* cited by examiner

EXCITATION LIGHT E1 TO E4
SIGNAL LIGHT S1
SIGNAL LIGHT S2
SIGNAL LIGHT S3
SIGNAL LIGHT S4
INTENSITY
WAVE-LENGTH
532nm
PHASE
TIME
700nm
1100nm 1B
2
E
S
11
12
13
13A
13B
13C
13D
A
A1
A2
A3
A4
3
15
16
4
14
P 1E
12
11
2
E
S
S1
S2
S3
S4
13
13A
13B
13C
13D
A
A1
A2
A3
A4
3
18
15
16
4
14
P 1F
11
S
21
12
S
S1
S2
S3
S4
E
E1
E2
E3
E4
2
13
13A
13B
13C
13D
A
A1
A2
A3
A4
3
22
15
16
4
14
P 1G
11
12
2
20
S
S1
S2
S3
S4
E
E1
E2
E3
E4
13
13A
13B
13C
13D
A
A1
A2
A3
A4
3
15
16
4
14
P

LASER AMPLIFICATION DEVICE AND LASER AMPLIFICATION METHOD

TECHNICAL FIELD

The present disclosure relates to a laser amplification device and a laser amplification method.

BACKGROUND ART

As a method for obtaining, for example, ultrashort pulsed light of the order of femtoseconds, a mode locking method is known in which laser oscillation is performed while the phases of the wavelength components in a beam having a wide spectral band are aligned. These days, there is an increasing demand for higher power of ultrashort pulsed light, and development of a technique for amplifying laser light having a wide spectral band in application of the mode locking method is advanced. As such a technique for laser amplification, an optical parametric amplification method is known in which signal light and excitation light are caused to be incident on a nonlinear optical crystal to amplify the signal light.

As a laser amplification device using the optical parametric amplification method, for example, there is a laser amplification device described in Patent Literature 1. This conventional laser amplification device includes a nonlinear optical crystal that transmits signal light and a shaping optical system that shapes excitation light and causes the excitation light to be incident on the nonlinear optical crystal. The shaping optical system includes an optical array that divides excitation light into a first divided beam and a second divided beam. The shaping optical system includes a lens that condenses the first divided beam and the second divided beam onto the nonlinear optical crystal such that the angle between the first divided beam and the signal light is different from the angle between the second divided beam and the signal light.

CITATION LIST

Patent Literature

Patent Literature 1: Japanese Unexamined Patent Publication No. 2020-112706

SUMMARY OF INVENTION

Technical Problem

In general, a nonlinear optical crystal has a property that the refractive index varies depending on the wavelength of incident light. In regard to such a property, in the laser amplification device described in Patent Literature 1 described above, while excitation light is divided, signal light having a wide spectral band in one beam is used, and the signal light and the excitation light are caused to be incident on the same portion of the nonlinear optical crystal in a spatially and temporally overlapping manner. Hence, in the laser amplification device described in Patent Literature 1, the phases of the wavelength components of the signal light after amplification (amplified light) are different from each other, and the wavelength components are emitted from the nonlinear optical crystal in a spatially unseparated state. Therefore, in the case where mode locking is performed using the amplified light, there is a need to spatially separate the wavelength components and then adjust the phases, and it is conceivable that the optical system for increasing the power of ultrashort pulsed light will be complicated.

The present disclosure has been made to solve the above issue, and an object of the present disclosure is to provide a laser amplification device and a laser amplification method that do not need spatial separation of the wavelength components in amplified light and can simplify the optical system for increasing the power of ultrashort pulsed light.

Solution to Problem

A laser amplification device according to an aspect of the present disclosure includes: an amplification unit configured to amplify an intensity of signal light and output amplified light; and a phase adjustment unit configured to adjust a phase of each wavelength component included in the signal light or the amplified light, in which the amplification unit includes: a signal light source configured to output the signal light; an excitation light source configured to output excitation light; and a nonlinear optical crystal configured to emit the amplified light by incidence of the signal light and the excitation light, the nonlinear optical crystal has a plurality of spatially different crystal portions, and the signal light source, the excitation light source, and the nonlinear optical crystal are arranged such that the signal light and the excitation light are simultaneously incident on the plurality of crystal portions and that elements of at least one of a set of angles of incidence between crystal axes of the plurality of crystal portions and the signal light and a set of angles of incidence between crystal axes of the plurality of crystal portions and the excitation light are different.

In this laser amplification device, signal light and excitation light are caused to be incident on the nonlinear optical crystal, and thereby amplified light in which the intensity of the signal light is amplified can generated. In this laser amplification device, the signal light and the excitation light are simultaneously incident on the plurality of spatially different crystal portions in the nonlinear optical crystal, and the elements of at least one of a set of the angles of incidence between the crystal axes of the plurality of crystal portions and the signal light and a set of the angles of incidence between the crystal axes of the plurality of crystal portions and the excitation light are different. Thus, the phases of the wavelength components of the amplified light emitted from the nonlinear optical crystal are different from each other, but these wavelength components can be emitted from the nonlinear optical crystal in a spatially separated state. Therefore, in this laser amplification device, spatial separation of the wavelength components in the amplified light is not necessary, and the optical system for increasing the power of ultrashort pulsed light can be simplified.

The plurality of crystal portions may be arranged in a spatially separated manner. In this case, the wavelength components in the amplified light can be spatially separated more reliably.

The plurality of crystal portions may be integrally coupled. In this case, the nonlinear optical crystal can be downsized. Further, the workability of positioning of the nonlinear optical crystal with respect to the optical system of signal light and excitation light can be enhanced.

The crystal axis directions of the plurality of crystal portions may be different from each other. In this case, the angles of signal light and excitation light to be incident on the plurality of crystal portions can be uniformly determined. Therefore, the angle adjustment of signal light and excitation light can be simplified.

A single beam of signal light and a single beam of excitation light may be incident on the plurality of crystal portions. In this case, the optical system of signal light and excitation light can be simplified. Unlike in the case where a plurality of beams of signal light and a plurality of beams of excitation light are used, a change in optical characteristics due to interference between beams of signal light or between beams of excitation light can be prevented. Further, utilization efficiency of excitation light can be sufficiently secured.

It is also possible to employ a configuration in which a plurality of beams of signal light are incident on the plurality of crystal portions at angles equal to each other and a plurality of beams of excitation light are incident on the plurality of crystal portions at angles equal to each other. In the case where signal light is divided into a plurality of beams, the wavelength width of each beam is moderately narrowed as compared to the case of a single beam having a wide wavelength width and a narrow time width, and excessive narrowing of the time width of each beam can be suppressed. Thereby, the peak intensities of signal light and excitation light fall within certain ranges, and therefore damage to the elements constituting the optical system can be suppressed.

The crystal axis directions of the plurality of crystal portions may be the same as each other. In this case, it is not necessary to prepare a plurality of crystal portions having crystal axis directions different from each other, and therefore the configuration of the nonlinear optical crystal can be simplified.

It is also possible to employ a configuration in which a single beam of signal light is incident on the plurality of crystal portions and a plurality of beams of excitation light are incident on the plurality of crystal portions at angles different from each other. In this case, the optical system of signal light can be simplified. Unlike in the case where a plurality of beams of signal light are used, a change in optical characteristics due to interference between beams of signal light can be prevented. Further, utilization efficiency of excitation light can be sufficiently secured.

It is also possible to employ a configuration in which a plurality of beams of signal light are incident on the plurality of crystal portions at angles different from each other and a single beam of excitation light is incident on the plurality of crystal portions. In this case, the optical system of excitation light can be simplified. Unlike in the case where a plurality of beams of excitation light are used, a change in optical characteristics due to interference between beams of excitation light can be prevented.

It is also possible to employ a configuration in which one of a set of a plurality of beams of signal light and a set of a plurality of beams of excitation light is incident on the plurality of crystal portions at angles equal to each other and the other set is incident on the plurality of crystal portions at angles different from each other. In the case where each of signal light and excitation light is divided into a plurality of beams, the wavelength width of each beam is moderately narrowed, and excessive narrowing of the time width of each beam can be suppressed. Thereby, the peak intensities of signal light and excitation light fall within certain ranges, and therefore damage to the elements constituting the optical system can be suppressed.

The laser amplification device may further include a light condensation unit that condenses amplified light in which a phase of each wavelength component is adjusted by the phase adjustment unit. Thereby, high-power ultrashort pulsed light can be generated without spatially separating the wavelength components in a stage subsequent to the amplification unit.

The laser amplification device may further include: a stretching unit that gives dispersion to the signal light to stretch a time width in a stage prior to the nonlinear optical crystal; and a compression unit that gives inverse dispersion to the amplified light to compress a time width in a stage subsequent to the nonlinear optical crystal. In this case, ultrashort pulsed light having high peak intensity can be obtained by using chirped pulse amplification to obtain amplified light having high energy and after the amplification compressing the time width of the amplified light. Further, the amplified light before compression has a relatively wide time width, and therefore damage to the elements constituting the optical system can be suppressed.

A laser amplification method according to an aspect of the present disclosure includes: an amplification step of causing signal light and excitation light to be incident on a nonlinear optical crystal to amplify an intensity of the signal light and outputting amplified light; and a phase adjustment step of adjusting a phase of each wavelength component included in the signal light or the amplified light, in which in the amplification step, the signal light and the excitation light are simultaneously caused to be incident on a plurality of spatially different crystal portions in the nonlinear optical crystal in a state where elements of at least one of a set of angles of incidence between crystal axes of the plurality of crystal portions and the signal light and a set of angles of incidence between crystal axes of the plurality of crystal portions and the excitation light are set different.

In this laser amplification method, signal light and excitation light are caused to be incident on the nonlinear optical crystal, and thereby amplified light in which the intensity of the signal light is amplified can be generated. In this laser amplification method, the signal light and the excitation light are simultaneously incident on the plurality of spatially different crystal portions in the nonlinear optical crystal in a state where the elements of at least one of a set of the angles of incidence between the crystal axes of the plurality of crystal portions and the signal light and a set of the angles of incidence between the crystal axes of the plurality of crystal portions and the excitation light are set different. Thus, the phases of the wavelength components of the amplified light emitted from the nonlinear optical crystal are different from each other, but these wavelength components can be emitted from the nonlinear optical crystal in a spatially separated state. Therefore, in this laser amplification method, spatial separation of the wavelength components in the amplified light is not necessary, and the optical system for increasing the power of ultrashort pulsed light can be simplified.

In the amplification step, the plurality of crystal portions may be arranged in a spatially separated manner. In this case, the wavelength components in the amplified light can be spatially separated more reliably.

In the amplification step, the plurality of crystal portions may be arranged in an integrally coupled manner, and in this case, the nonlinear optical crystal can be downsized. Further, the workability of positioning of the nonlinear optical crystal with respect to the optical system of signal light and excitation light can be enhanced.

In the amplification step, the crystal axis directions of the plurality of crystal portions may be set different from each other. In this case, the angles of signal light and excitation light to be incident on the plurality of crystal portions can be uniformly determined. Therefore, the angle adjustment of signal light and excitation light can be simplified.

In the amplification step, a single beam of signal light and a single beam of excitation light may be caused to be incident on the plurality of crystal portions. In this case, the optical system of signal light and excitation light can be simplified. Unlike in the case where a plurality of beams of signal light and a plurality of beams of excitation light are used, a change in optical characteristics due to interference between beams of signal light or between beams of excitation light can be prevented. Further, utilization efficiency of excitation light can be sufficiently secured.

The amplification step may employ a procedure in which a plurality of beams of signal light are caused to be incident on the plurality of crystal portions at angles equal to each other and a plurality of beams of excitation light are caused to be incident on the plurality of crystal portions at angles equal to each other. In the case where signal light is divided into a plurality of beams, the wavelength width of each beam is moderately narrowed as compared to the case of a single beam having a wide wavelength width and a narrow time width, and excessive narrowing of the time width of each beam can be suppressed. Thereby, the peak intensities of signal light and excitation light fall within certain ranges, and therefore damage to the elements constituting the optical system can be suppressed.

In the amplification step, the crystal axis directions of the plurality of crystal portions may be set the same as each other. In this case, it is not necessary to prepare a plurality of crystal portions having crystal axis directions different from each other, and therefore the configuration of the nonlinear optical crystal can be simplified.

The amplification step may employ a procedure in which a single beam of signal light is caused to be incident on the plurality of crystal portions and a plurality of beams of excitation light are caused to be incident on the plurality of crystal portions at angles different from each other. In this case, the optical system of signal light can be simplified. Unlike in the case where a plurality of beams of signal light are used, a change in optical characteristics due to interference between beams of signal light can be prevented. Further, utilization efficiency of excitation light can be sufficiently secured.

The amplification step may employ a procedure in which a plurality of beams of signal light are caused to be incident on the plurality of crystal portions at angles different from each other and a single beam of excitation light is caused to be incident on the plurality of crystal portions. In this case, the optical system of excitation light can be simplified. Unlike in the case where a plurality of beams of excitation light are used, a change in optical characteristics due to interference between beams of excitation light can be prevented.

The amplification step may employ a procedure in which one of a set of a plurality of beams of signal light and a set of a plurality of beams of excitation light is caused to be incident on the plurality of crystal portions at angles equal to each other and the other set is caused to be incident on the plurality of crystal portions at angles different from each other. In the case where each of signal light and excitation light is divided into a plurality of beams, the wavelength width of each beam is moderately narrowed, and excessive narrowing of the time width of each beam can be suppressed. Thereby, the peak intensities of signal light and excitation light fall within certain ranges, and therefore damage to the elements constituting the optical system can be suppressed.

The laser amplification method may further include a light condensation step of condensing amplified light in which a phase of each wavelength component is adjusted by the phase adjustment step. Thereby, high-power ultrashort pulsed light can be generated without spatially separating the wavelength components in a stage subsequent to the amplification unit.

The laser amplification method may further include: a stretching step of giving dispersion to the signal light to stretch a time width as a step prior to the amplification step; and a compression step of giving inverse dispersion to the amplified light to compress a time width as a step subsequent to the amplification step. In this case, amplified light having high peak intensity can be obtained by using chirped pulse amplification to obtain amplified light having high energy and after the amplification compressing the time width of the amplified light. Further, the amplified light before compression has a relatively wide time width, and therefore damage to the elements constituting the optical system can be suppressed.

Advantageous Effects of Invention

According to the present disclosure, spatial separation of the wavelength components in amplified light is not necessary, and the optical system for increasing the power of ultrashort pulsed light can be simplified.

DESCRIPTION OF EMBODIMENTS

Hereinbelow, preferred embodiments of a laser amplification device and a laser amplification method according to an aspect of the present disclosure are described in detail with reference to the drawings.

[Principle of Laser Amplification of Present Disclosure]

First, the principle of the laser amplification device and the laser amplification method according to the present embodiment is described. The laser amplification device and the laser amplification method according to the present embodiment are configured by applying an optical parametric amplification method that causes signal light and excitation light to be incident on a nonlinear optical crystal to amplify the signal light. The laser amplification device and the laser amplification method according to the present embodiment can generate, for example, femtosecond order high-power ultrashort pulsed light by applying a mode locking method to amplified light in which the intensity of signal light is amplified by the optical parametric amplification method.

In a general laser amplification method, the wavelength of laser light amplified is determined by the medium used. In contrast, in the optical parametric amplification method, the wavelength of laser light amplified can be selected by adjusting the crystal cut angle in the nonlinear optical crystal or the angles of signal light and excitation light incident on the nonlinear optical crystal.

Figure 1:
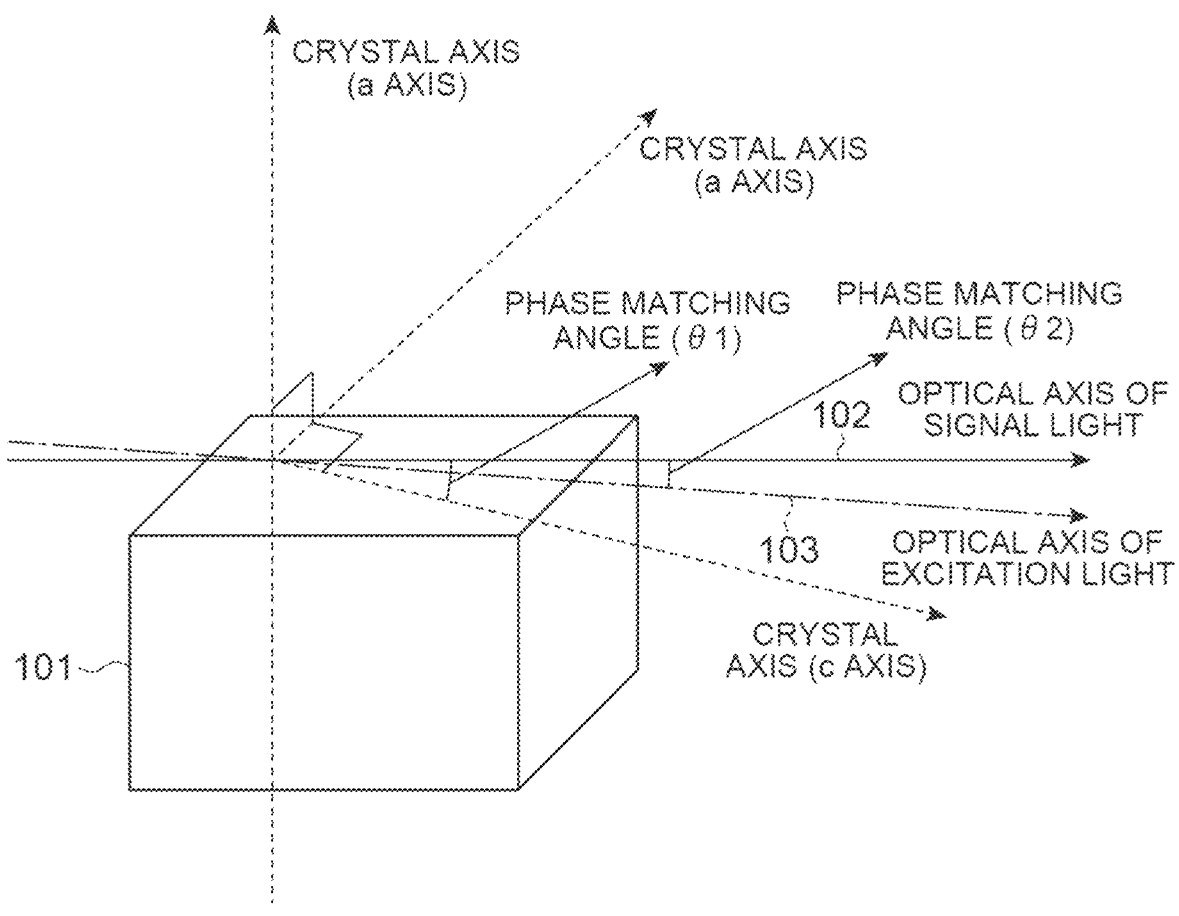
FIG. 1 is a schematic diagram showing a relationship between a nonlinear optical crystal used for an optical parametric amplification method and the optical axes of incident beams.

FIG. 1 is a schematic diagram showing a relationship between a nonlinear optical crystal used for the optical parametric amplification method and the optical axes of incident beams. As shown in the drawing, a nonlinear optical crystal 101 propagates signal light 102 in the direction of an angle θ1 that satisfies the phase matching angle with respect to a certain crystal axis direction (herein, the c axis), and furthermore propagates excitation light 103 in the direction of an angle θ2 that satisfies the phase matching angle with respect to the propagation direction of the signal light 102. Thereby, optical parametric amplification of the signal light 102 is enabled. For example, in the case where a plurality of nonlinear optical crystals 101 of which the crystal cut angles are slightly different are prepared, the wavelength band (amplification band) of amplified light obtained by amplifying the intensity of the signal light 102 can be made different between nonlinear optical crystals 101.

Figure 2:
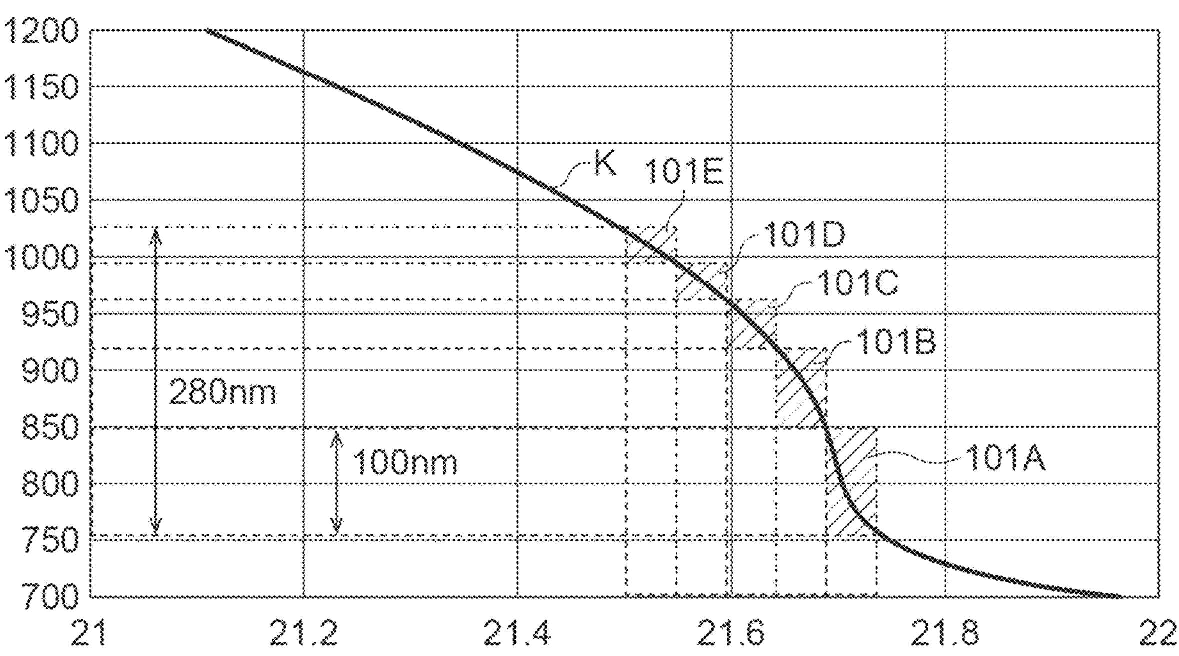
FIG. 2 is a diagram showing a design example of amplified light based on the optical parametric amplification method.

FIG. 2 is a diagram showing a design example of amplified light based on the optical parametric amplification method. In the drawing, the horizontal axis represents the crystal cut angle (°), and the vertical axis represents wavelength (nm). A curved line K shown in the drawing indicates wavelengths at which amplification is possible when excitation light is caused to be incident with a predetermined angular difference (an angle corresponding to θ2 of FIG. 1) with respect to signal light incident in parallel to the crystal cut angle (an angle corresponding to θ1 of FIG. 1). In the example of FIG. 2, the angular difference between the signal light and the excitation light was set to 2.6°, and the wavelength of the excitation light was set to 527 nm. In the example of FIG. 2, five nonlinear optical crystals 101A to 101E having cut angles different from each other were prepared, and the nonlinear optical crystals 101A to 101E were joined to each other to verify the expandability of the amplification band of signal light. The cut angles of the nonlinear optical crystals 101A to 101E were set to 21.70°, 21.66°, 21.62°, 21.58°, and 21.54°, respectively.

From the result of FIG. 2, it is found that, when optical parametric amplification is performed using the five nonlinear optical crystals 101A to 101E having cut angles different from each other, the amplification band of the signal light 102 is estimated to be about 280 nm. For example, when optical parametric amplification is performed using only the nonlinear optical crystal 101A, the amplification band of the signal light 102 is estimated to be about 100 nm. It can be seen that, when a plurality of nonlinear optical crystals 101 having slightly different cut angles are prepared, the amplification bands of the signal light 102 in the nonlinear optical crystals 101 are combined, and the amplification band of the signal light 102 can be expanded.

In the mode locking method, the time width can be further narrowed by aligning the phases of beams of pulsed light of a wider wavelength region. For example, for signal light 102 subjected to optical parametric amplification using only the nonlinear optical crystal 101A, the time width of ultrashort pulsed light obtained by mode locking was about 10 fs. In contrast, for signal light 102 subjected to optical parametric amplification using the nonlinear optical crystals 101A to 101E, the time width of ultrashort pulsed light obtained by mode locking was narrowed to about 4 fs. In the following, embodiments of a laser amplification device and a laser amplification method configured based on such a principle are described in detail.

First Embodiment

Figure 3:
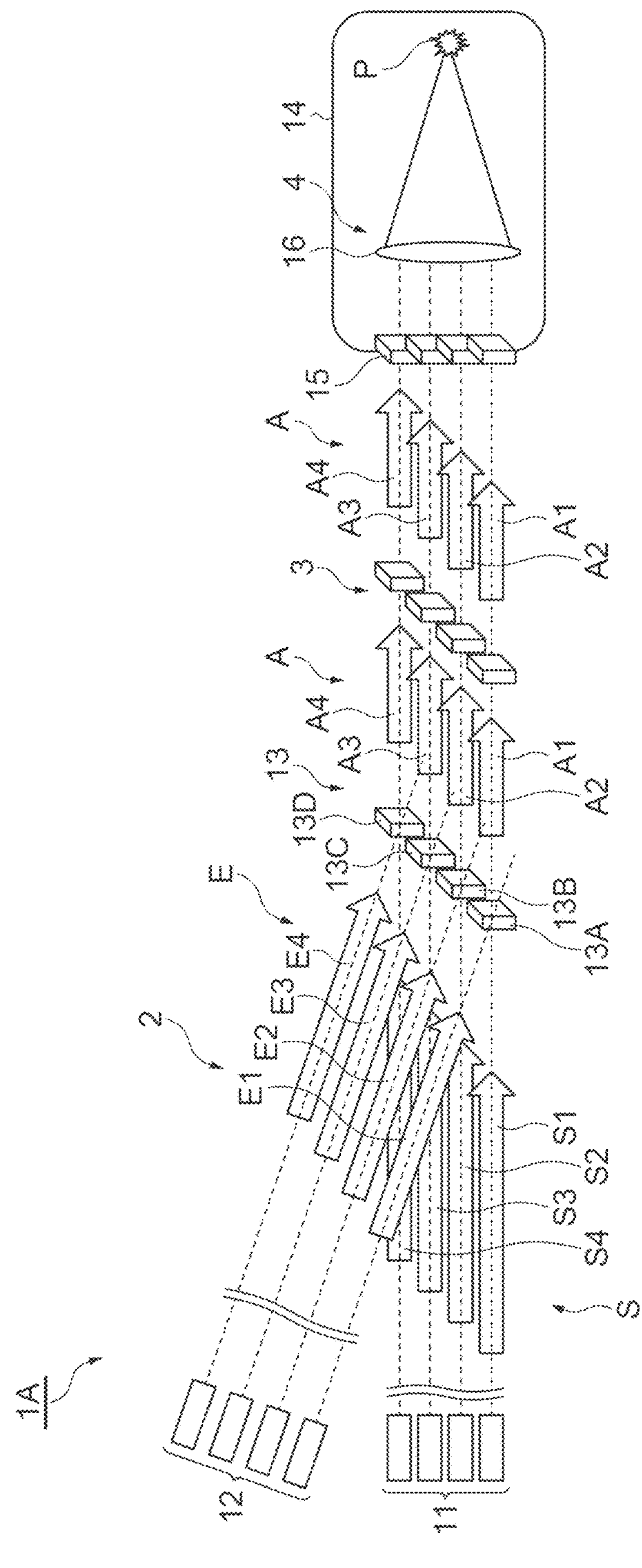
FIG. 3 is a schematic diagram showing a configuration of a laser amplification device according to a first embodiment of the present disclosure.

FIG. 3 is a schematic diagram showing a configuration of a laser amplification device according to a first embodiment of the present disclosure. As shown in the drawing, a laser amplification device 1A according to the first embodiment includes an amplification unit 2, a phase adjustment unit 3, and a light condensation unit 4. The amplification unit 2 is a portion that executes an amplification step of amplifying the intensity of signal light S and outputting amplified light A. The amplification unit 2 includes a signal light source 11 that outputs signal light S, an excitation light source 12 that outputs excitation light E, and a nonlinear optical crystal 13 that emits amplified light A by incidence of the signal light S and the excitation light E.

The signal light S is light to be amplified by the laser amplification device 1. The signal light S is herein pulsed light. As the signal light source 11, for example, a titanium sapphire laser, an Er-doped laser, a Nd-doped laser, a Yb-doped laser, a Tm-doped laser, a Cr-doped laser, an Fe-doped laser, super continuum light, or the like can be used. In the present embodiment, a plurality of (four) beams of signal light S1 to S4 are to be incident on the nonlinear optical crystal 13 from the signal light source 11. The optical axes of the beams of signal light S1 to S4 are arranged in a line in a direction orthogonal to the direction in which these optical axes extend. The angles of incidence of the beams of signal light S1 to S4 on the nonlinear optical crystal 13 are equal to each other. The beams of signal light S1 to S4 may be designed to be outputted from a plurality of signal light sources 11. The beams of signal light S1 to S4 may be obtained by separating signal light S from a single signal light source 11 by means of a separation optical system or the like.

The excitation light E is light used for amplification of the signal light S. The excitation light E is herein pulsed light similarly to the signal light S. As the excitation light source 12, for example, a titanium sapphire laser, an Er-doped laser, a Nd-doped laser, a Yb-doped laser, a Tm-doped laser, a Cr-doped laser, an Fe-doped laser, or the like can be used. In the present embodiment, a plurality of (four) beams of excitation light E1 to E4 are to be incident on the nonlinear optical crystal 13 from the excitation light source 12. The optical axes of the beams of excitation light E1 to E4 are arranged in a line in a direction orthogonal to the direction in which these optical axes extend. The angles of incidence of the beams of excitation light E1 to E4 on the nonlinear optical crystal 13 are equal to each other. The beams of excitation light E1 to E4 may be designed to be outputted from a plurality of excitation light sources 12. The beams of excitation light E1 to E4 may be obtained by separating excitation light E from a single excitation light source 12 by means of a separation optical system or the like.

The nonlinear optical crystal 13 is a portion that emits amplified light A by incidence of the signal light S and the excitation light E due to the nonlinear optical effect. As the nonlinear optical crystal 13, for example, a BBO ($\beta$-$BaB_2O_4$) crystal, an LBO ($LiB_3O_5$) crystal, a CLBO ($CsLiB_6O_{10}$) crystal, a YCOB ($YCa_4O(BO_3)_3$) crystal, a GaSe crystal, an $AgGaS_2$ crystal, an $AgGaSe_2$ crystal, a $LiInS_2$ crystal, a $LiInSe_2$ crystal, or the like can be used. The nonlinear optical crystal 13 has a plurality of spatially different crystal portions 13A to 13D. The term "spatially different" means an arrangement of not overlapping with each other in an in-plane direction of cross sections of the beams of signal light S. In the present embodiment, the plurality of crystal portions 13A to 13D are arranged in a line at a slight interval along the direction in which the optical axes of the beams of signal light S1 to S4 are arranged. The plurality of crystal portions 13A to 13D may be integrally coupled by an adhesive or the like, or may be arranged in a state of being simply in contact without an adhesive or the like.

The signal light source 11, the excitation light source 12, and the nonlinear optical crystal 13 described above are arranged such that the signal light S and the excitation light E are simultaneously incident on the plurality of crystal portions 13A to 13D and that the elements of at least one of a set of the angles of incidence between the crystal axes of the plurality of crystal portions 13A to 13D and the signal light S and a set of the angles of incidence between the crystal axes of the plurality of crystal portions 13A to 13D and the excitation light E are different.

In the present embodiment, the signal light S and the excitation light E are incident on the nonlinear optical crystal 13 from directions different from each other. The difference between the angle of incidence of the beams of signal light S1 to S4 and the angle of incidence of the beams of excitation light E1 to E4 on the nonlinear optical crystal 13 (an angle corresponding to θ2 of FIG. 1) is, for example, 2.6°. In the present embodiment, the crystal axis directions of the plurality of crystal portions 13A to 13D are different from each other. That is, the plurality of crystal portions 13A to 13D have crystal cut angles different from each other. Herein, the cut angles (angles corresponding to θ1 of FIG. 1) of the crystal portions 13A to 13D are 21.65°, 21.63°, 21.61°, 21.59°, and 21.57°, respectively.

The beams of signal light S1 to S4 and the beams of excitation light E1 to E4 are simultaneously incident on the plurality of crystal portions 13A to 13D, respectively. Specifically, signal light S1 and excitation light E1 are simultaneously incident on crystal portion 13A, and signal light S2 and excitation light E2 are simultaneously incident on crystal portion 13B. Signal light S3 and excitation light E3 are simultaneously incident on crystal portion 13C. Signal light S4 and excitation light E4 are simultaneously incident on crystal portion 13D.

Beams of amplified light A1 to A4 obtained by amplifying the intensities of the beams of signal light S1 to S4 are emitted from the plurality of crystal portions 13A to 13D, respectively. The emission optical axes of the beams of amplified light A1 to A4 coincide with the optical axes of the beams of signal light S1 to S4 before amplification, respectively. In the present embodiment, as described above, the nonlinear optical crystal 13 has a plurality of spatially different crystal portions 13A to 13D. Therefore, the beams of amplified light A1 to A4 are emitted from the plurality of crystal portions 13A to 13D, respectively, in a state of being spatially separated from each other.

Although not illustrated, when the beams of signal light S1 to S4 pass through the nonlinear optical crystal 13, idler light having wavelengths different from those of the beams of signal light S1 to S4 before amplification can be generated corresponding to the beams of signal light S1 to S4, in addition to the beams of amplified light A1 to A4. The optical axes of these beams of idler light are shifted from the optical axes of the beams of signal light S1 to S4 before amplification, but these beams of idler light can also be used as amplified light.

The phase adjustment unit 3 is a portion that executes a phase adjustment step of adjusting the phase of each wavelength component included in the signal light S or the amplified light A. The phase adjustment unit 3 can be composed of, for example, a spatial light phase modulator such as an LCOS-SLM, a deformable mirror, a femtosecond pulse shaper, an acousto-optic programmable dispersion filter, etc. In the present embodiment, the phase adjustment unit 3 is placed on each of the optical axes of the beams of amplified light A1 to A4 between the nonlinear optical crystal 13 and the light condensation unit 4. The phase adjustment unit 3 performs phase adjustment so that the phases of the wavelength components included in the beams of amplified light A1 to A4 are aligned with each other. In the present embodiment, at the time of incidence on the light condensation unit 4, the beams of amplified light A1 to A4 pass through optical windows 15 of a vacuum chamber 14 described later. Hence, in the phase adjustment unit 3, it is preferable that the phase of each wavelength component included in the beams of amplified light A1 to A4 be adjusted taking account of a phase shift due to passage through the optical window 15.

The phase adjustment unit 3 needs only to act so that the phases of the wavelength components included in the amplified light A are aligned when the amplified light A is incident on the light condensation unit 4 in a stage subsequent to the nonlinear optical crystal 13, and the phases of the wavelength components included in the amplified light A may not be aligned at the stage when the wavelength components have passed through the phase adjustment unit 3. Thus, the phase adjustment unit 3 may be placed on the side of a stage prior to the nonlinear optical crystal 13. For example, the phase adjustment unit 3 may be placed on each of the optical axes of the beams of signal light S1 to S4 between the signal light source 11 and the nonlinear optical crystal 13. In this case, the phase of each wavelength component included in the beams of signal light S1 to S4 may be adjusted taking account of both a phase shift due to passage through the nonlinear optical crystal 13 and a phase shift due to passage through the optical window 15.

The light condensation unit 4 is a portion that executes a light condensation step of condensing the amplified light A in which the phase of each wavelength component is adjusted by the phase adjustment unit 3. The light condensation unit 4 is formed of, for example, a condensing lens 16 placed in the vacuum chamber 14. The condensing lens 16 is, for example, a convex lens. The light condensation unit 4 may be formed of a concave mirror. The beams of amplified light A1 to A4 in which the phases of the wavelength components are aligned through the phase adjustment unit 3 enter the vacuum chamber 14 via optical windows 15 arranged corresponding to the optical axes of the beams of amplified light A1 to A4, and are condensed to one point by the condensing lens 16. By the condensation to one point of the beams of amplified light A1 to A4 in which the phases of the wavelength components are aligned, the wavelength components of the beams of amplified light A1 to A4 are combined into wide-band light, and high-power ultrashort pulsed light P is generated at the light condensation point.

Figure 4:
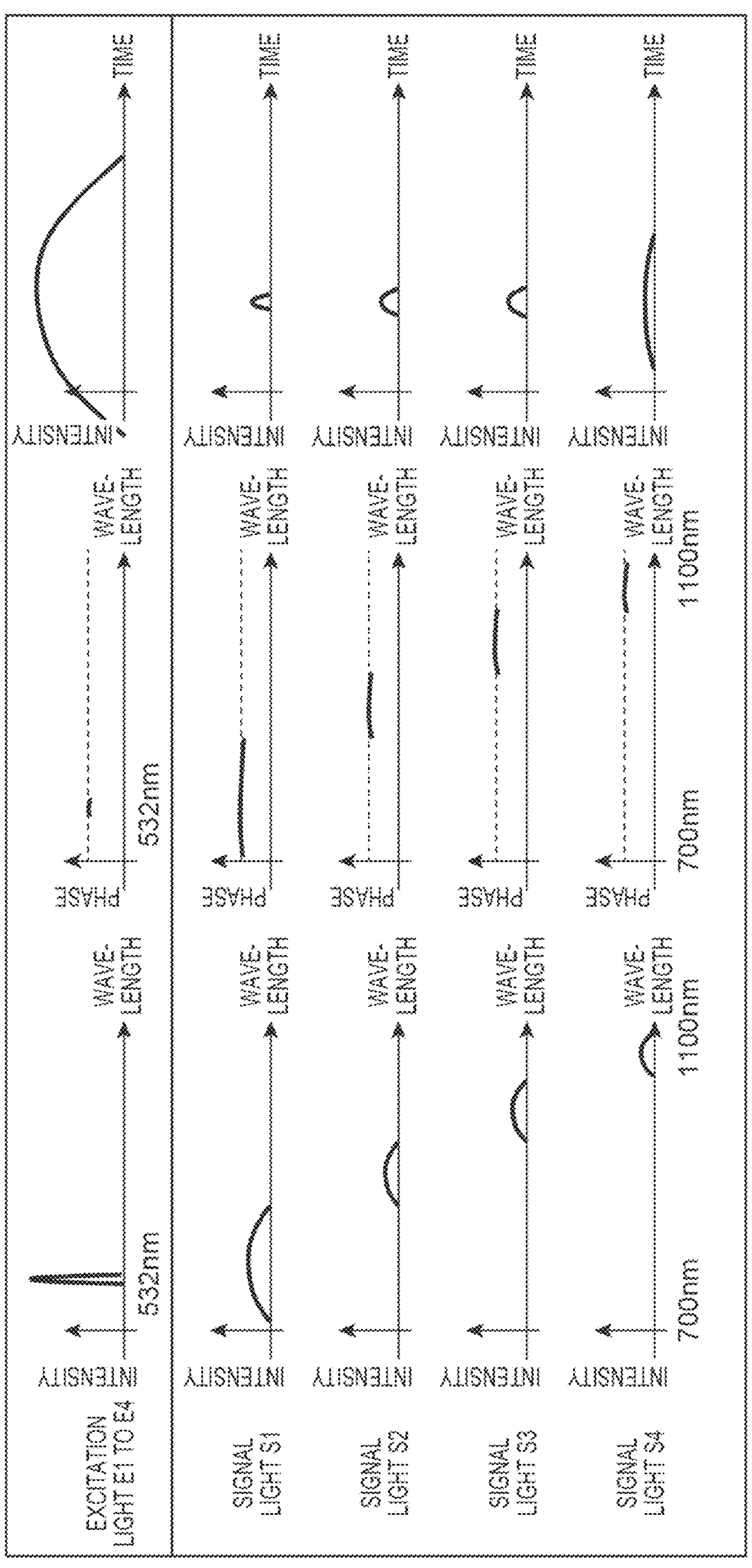
FIG. 4 is a schematic diagram showing a manner of waveforms of the wavelength, the phase, and the time of signal light and excitation light before amplification in the first embodiment.
Figure 5:
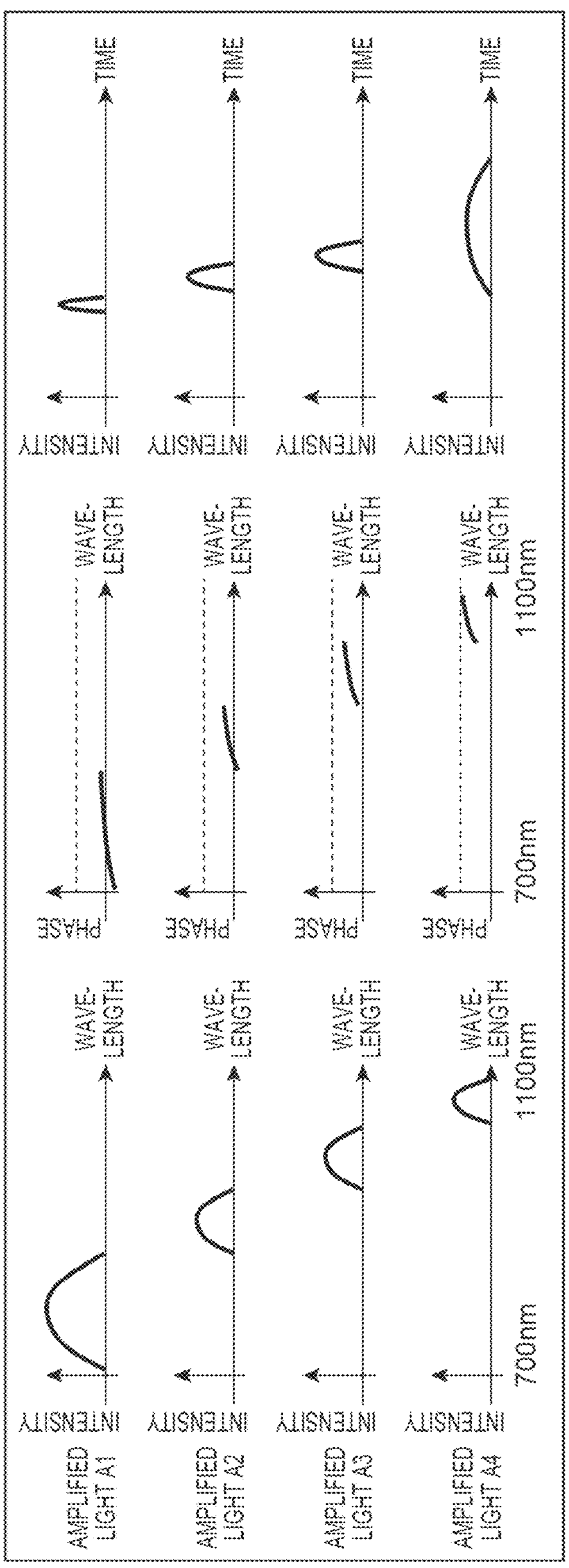
FIG. 5 is a schematic diagram showing a manner of waveforms of the wavelength, the phase, and the time of signal light after amplification in the first embodiment.
Figure 6:
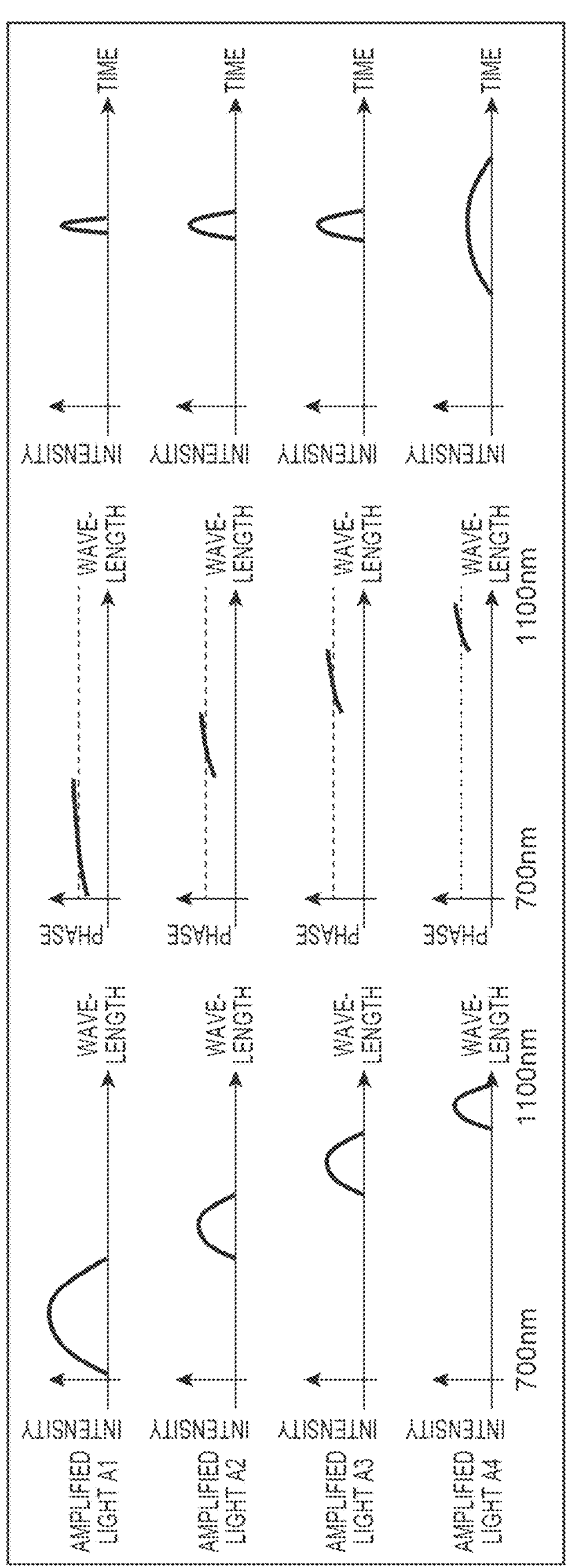
FIG. 6 is a schematic diagram showing a manner of waveforms of the wavelength, the phase, and the time of amplified light after phase adjustment in the first embodiment.

FIGS. 4 to 6 are diagrams schematically showing manners of waveforms of the wavelength, the phase, and the time of signal light S, excitation light E, and amplified light A at relevant positions of the laser amplification device 1A. FIG. 4 is a diagram schematically showing a manner of waveforms of the wavelength, the phase, and the time of signal light S emitted from the signal light source 11 and excitation light E emitted from the excitation light source 12 (that is, signal light S and excitation light before amplification).

As shown in the drawing, the beams of signal light S1 to S4 have, for example, center wavelengths different from each other in a range of 700 nm to 1100 nm. The phases of the beams of signal light S1 to S4 are substantially fixed in the respective wavelength bands, and are aligned with each other. The time widths of the beams of signal light S1 to S4 are, for example, each in a range of 10 fs to 1 ps, and are each substantially inversely proportional to their own wavelength widths. In the present embodiment, the beams of excitation light E1 to E4 have center wavelengths the same as each other. The center wavelengths of the beams of excitation light E1 to E4 may be different from each other. The phases of the beams of excitation light E1 to E4 are substantially fixed in the respective wavelength bands, and are aligned with each other. The time widths of the beams of excitation light E1 to E4 are, for example, each in a range of 1 ps to 1 ns.

In the example of FIG. 4, signal light S1 has a center wavelength of 800 nm, a wavelength width of 100 nm, and a time width (full width at half maximum) of 10 fs. Signal light S2 has a center wavelength of 885 nm, a wavelength width of 70 nm, and a time width (full width at half maximum) of 16 fs. Signal light S3 has a center wavelength of 945 nm, a wavelength width of 50 nm, and a time width (full width at half maximum) of 26 fs. Signal light S4 has a center wavelength of 984 nm, a wavelength width of 28 nm, and a time width (full width at half maximum) of 50 fs. Each of the beams of excitation light E1 to E4 has a center wavelength of 527 nm, a wavelength width of 0.1 nm, and a time width (full width at half maximum) of 10 ps.

Each wavelength component of the signal light S may have a band wider than the wavelength band to be subjected to amplification by the amplification unit 2. That is, the wavelength bands of the beams of signal light S1 to S4 may overlap with each other. In this case, the wavelength band of amplified light A after condensation by the light condensation unit 4 is continuous, and the time waveform of the resulting ultrashort pulsed light P can be brought close to a Gaussian distribution or a Sinc function distribution. Even in the case where the wavelength bands of the beams of signal light S1 to S4 are not made to overlap with each other, ultrashort pulsed light having a time waveform different from the Gaussian distribution can be obtained by bringing the wavelength bands close to each other.

FIG. 5 is a diagram schematically showing a manner of waveforms of the wavelength, the phase, and the time of amplified light A emitted from the nonlinear optical crystal 13 (that is, the signal light S after amplification). As shown in the drawing, in the beams of amplified light A1 to A4 emitted from the nonlinear optical crystal 13, the intensity is increased with respect to the beams of signal light S1 to S4 by optical parametric amplification. On the other hand, the nonlinear optical crystal 13 has a property that the refractive index varies depending on the wavelength of incident light. Therefore, the phases of the wavelength components of the beams of amplified light A1 to A4 are delayed according to the wavelength components of the beams of signal light S1 to S4, and are shifted from each other. The time widths of the beams of amplified light A1 to A4 are maintained in the state of the time widths of the beams of signal light S1 to S4. The peak position of the time waveform is shifted according to the wavelength difference.

Figure 7:
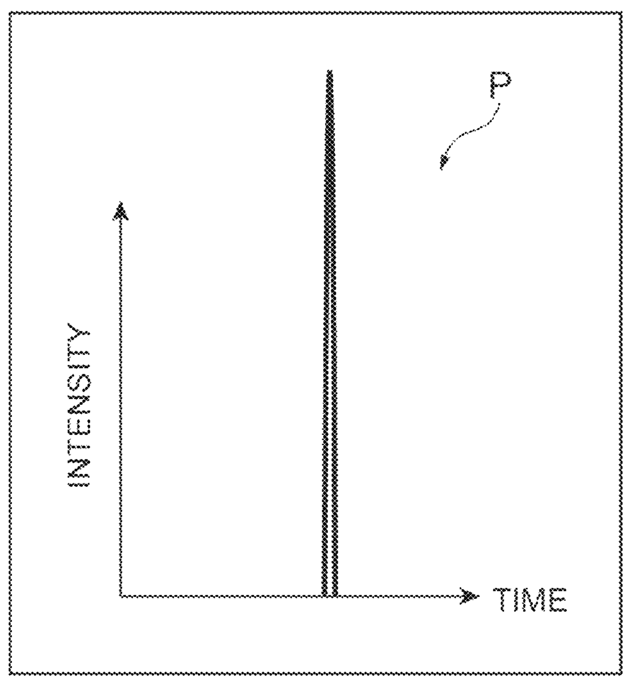
FIG. 7 is a schematic diagram showing a time waveform of ultrashort pulsed light obtained by a light condensation unit in the first embodiment.

FIG. 6 is a diagram schematically showing a manner of waveforms of the wavelength, the phase, and the time of amplified light A after phase adjustment. As shown in the drawing, in the beams of amplified light A1 to A4 after phase adjustment, while the intensity before phase adjustment is maintained, the phases of the wavelength components generated at the time of amplification in the nonlinear optical crystal 13 are aligned with each other. The beams of amplified light A1 to A4 in which the phases of the wavelength components are aligned are condensed by the light condensation unit 4, and thereby high-power ultrashort pulsed light P having a time width (full width at half maximum) of about several femtoseconds to 100 femtoseconds is generated as shown in FIG. 7.

As described hereinabove, in the laser amplification device 1A, signal light S and excitation light E are caused to be incident on the nonlinear optical crystal 13, and thereby amplified light A in which the intensity of the signal light S is amplified can be generated. In the laser amplification device 1A, the signal light S and the excitation light E are incident on the plurality of spatially different crystal portions 13A to 13D in the nonlinear optical crystal 13, and the elements of both of a set of the angles of incidence between the crystal axes of the plurality of crystal portions 13A to 13D and the signal light S and a set of the angles of incidence between the crystal axes of the plurality of crystal portions 13A to 13D and the excitation light E are different. Thus, the phases of the wavelength components of the beams of amplified light A1 to A4 emitted from the nonlinear optical crystal 13 are different from each other, but these wavelength components can be emitted from the nonlinear optical crystal 13 in a spatially separated state. Therefore, in the laser amplification device 1A, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified.

In the laser amplification device 1A, the plurality of crystal portions 13A to 13D are arranged in a spatially separated manner. Thereby, the wavelength components in the beams of amplified light A1 to A4 can be spatially separated more reliably. In the case where the plurality of crystal portions 13A to 13D are integrally coupled by an adhesive or the like, the nonlinear optical crystal 13 can be downsized. Further, the workability of positioning of the nonlinear optical crystal 13 with respect to the optical system of signal light S and excitation light E can be enhanced.

In the laser amplification device 1A, the crystal axis directions of the plurality of crystal portions 13A to 13D are different from each other. Then, a plurality of beams of signal light S1 to S4 are incident on the plurality of crystal portions 13A to 13D at angles equal to each other, and a plurality of beams of excitation light E1 to E4 are incident on the plurality of crystal portions 13A to 13D at angles equal to each other. By thus setting the crystal axis directions of the plurality of crystal portions 13A to 13D to be different from each other, the angles of the beams of signal light S1 to S4 and the beams of excitation light E1 to E4 to be incident on the plurality of crystal portions 13A to 13D can be uniformly determined. Therefore, the angle adjustment of signal light S and excitation light E can be simplified. Further, by dividing signal light S into a plurality of beams, the wavelength width of each beam is moderately narrowed as compared to the case of a single beam having a wide wavelength width and a narrow time width, and excessive narrowing of the time width of each beam can be suppressed. Thereby, the peak intensities of the beams of signal light S1 to S4 and the beams of excitation light E1 to E4 fall within certain ranges, and therefore damage to the elements constituting the optical system can be suppressed.

The laser amplification device 1A includes a light condensation unit 4 that condenses the beams of amplified light A1 to A4 in which the phases of the wavelength components are adjusted by the phase adjustment unit 3. Thereby, high-power ultrashort pulsed light P can be generated without spatially separating the wavelength components in a stage subsequent to the amplification unit 2.

Second Embodiment

Figure 8:
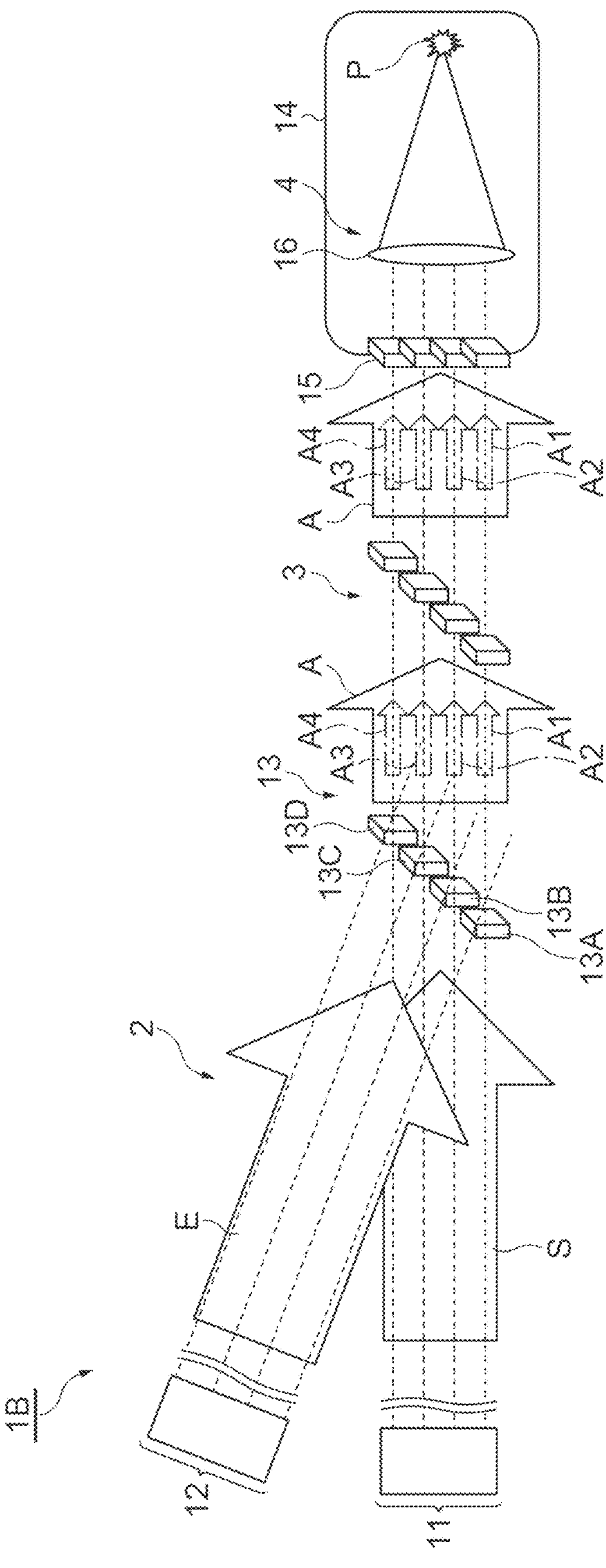
FIG. 8 is a schematic diagram showing a configuration of a laser amplification device according to a second embodiment of the present disclosure.

FIG. 8 is a schematic diagram showing a configuration of a laser amplification device according to a second embodiment of the present disclosure. As shown in the drawing, a laser amplification device 1B according to the second embodiment is different from the first embodiment in that a single beam of signal light S and a single beam of excitation light E are incident on the plurality of crystal portions 13A to 13D. The crystal axis directions of the plurality of crystal portions 13A to 13D are different from each other like in the first embodiment.

Figure 9:
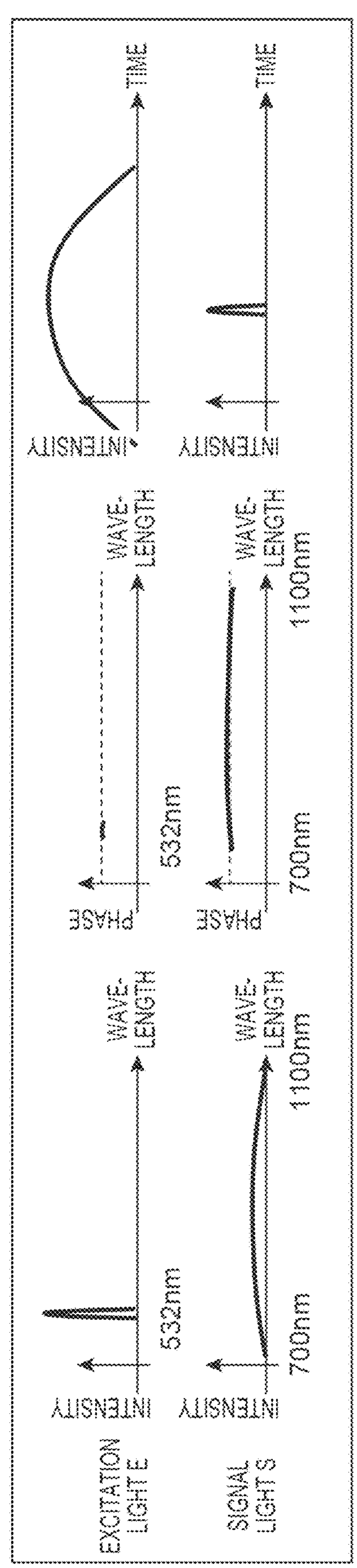
FIG. 9 is a schematic diagram showing a manner of waveforms of the wavelength, the phase, and the time of signal light and excitation light before amplification in the second embodiment.

In the laser amplification device 1B, as shown in FIG. 9, the signal light S has a wide wavelength band up to 200 nm or more in a range of 700 nm to 1100 nm, for example. The phase of the signal light S is substantially fixed in each wavelength band. The time width of the signal light S is, for example, in a range of 10 fs to 1 ps, and is inversely proportional to its own wavelength width. Herein, the time width of the signal light S is, for example, 4.5 fs. The waveforms of the wavelength, the phase, and the time of the excitation light E are similar to those of the beams of excitation light E1 to E4 of the first embodiment.

In the laser amplification device 1B, since a single beam of signal light S is used, also the amplified light A emitted from the nonlinear optical crystal 13 is apparently a single beam. However, since the crystal axis directions of the plurality of crystal portions 13A to 13D are different from each other, the actual amplified light A can be regarded as an aggregate of beams of amplified light A1 to A4 emitted from the plurality of spatially different crystal portions 13A to 13D, respectively. The phases of the wavelength components of the beams of amplified light A1 to A4 are different from each other (see FIG. 5), but the beams of amplified light A1 to A4 are emitted from the plurality of crystal portions 13A to 13D, respectively, from the nonlinear optical crystal 13 in a spatially separated state.

Also in such a laser amplification device 1B, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified.

In the laser amplification device 1B, a single beam of signal light S and a single beam of excitation light E are incident on the plurality of crystal portions 13A to 13D. By such a configuration, there is no need to use a plurality of signal light sources 11 or a plurality of excitation light sources 12, and the optical system of signal light S and excitation light E can be simplified. Further, the optical axes of signal light S and excitation light E can be easily adjusted. By using a single beam of signal light S, phase adjustment in the phase adjustment unit 3 can be performed with good accuracy. Unlike in the case where a plurality of beams of signal light S and a plurality of beams of excitation light E are used, a change in optical characteristics due to interference between beams of signal light S or between beams of excitation light E can be prevented. Further, utilization efficiency of excitation light E can be sufficiently secured.

Third Embodiment

Figure 10:
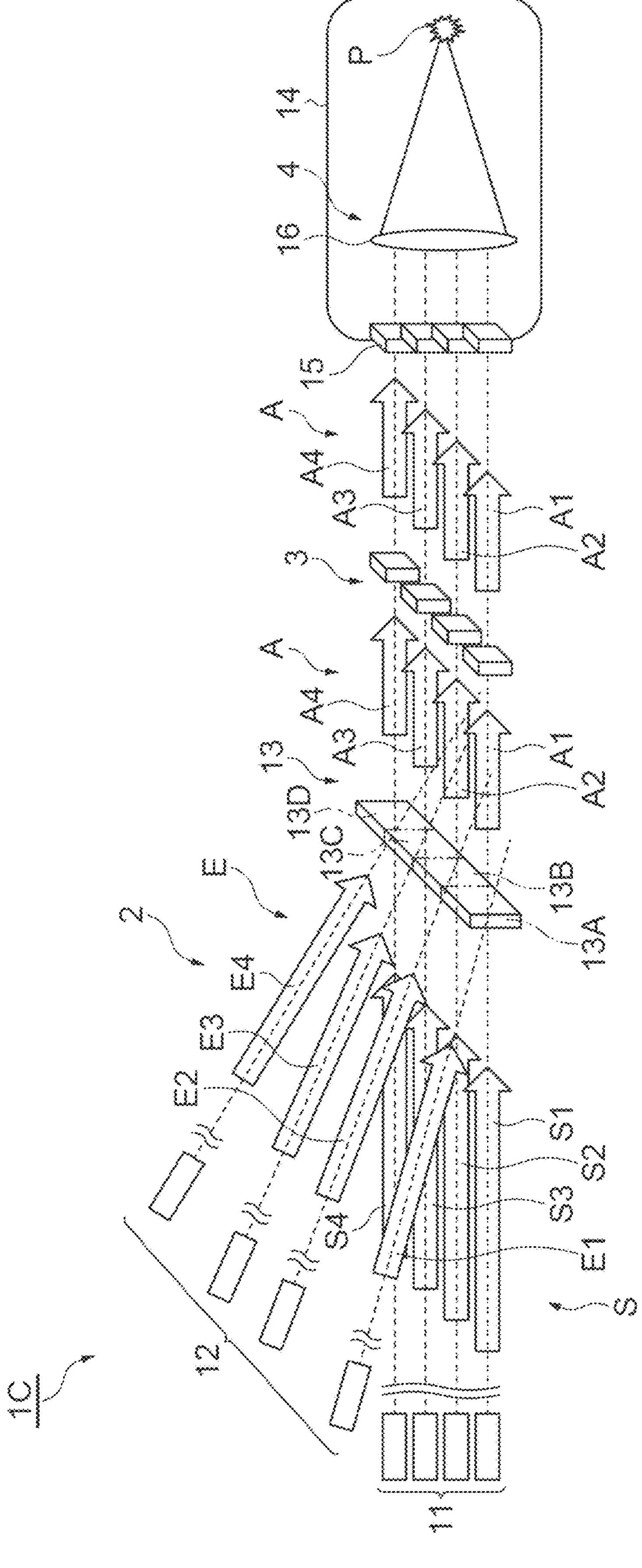
FIG. 10 is a schematic diagram showing a configuration of a laser amplification device according to a third embodiment of the present disclosure.

FIG. 10 is a schematic diagram showing a configuration of a laser amplification device according to a third embodiment of the present disclosure. As shown in the drawing, a laser amplification device 1C according to the third embodiment is different from the first embodiment in that the crystal axis directions of the plurality of crystal portions 13A to 13D are the same as each other.

In the laser amplification device 1C, the nonlinear optical crystal 13 is formed of a crystal having one direction as the crystal axis direction. The cut angle of the crystal portion (an angle corresponding to θ1 of FIG. 1) is, for example, 21.65°. The nonlinear optical crystal 13 is apparently a single crystal, but can be regarded as an aggregate of a plurality of crystal portions 13A to 13D having crystal axis directions the same as each other. In the laser amplification device 1C, the waveforms of the wavelength, the phase, and the time of the signal light S and the excitation light E are similar to those of the beams of signal light S1 to S4 and the beams of excitation light E1 to E4 of the first embodiment (see FIG. 4).

On the other hand, in the laser amplification device 1C, a plurality of beams of signal light S1 to S4 are incident on the plurality of crystal portions 13A to 13D, respectively, at angles equal to each other, and a plurality of beams of excitation light E1 to E4 are incident on the plurality of crystal portions 13A to 13D, respectively, at angles different from each other. In the example of FIG. 10, the plurality of beams of excitation light E1 to E4 have angles (angles corresponding to θ2 of FIGS. 1) of 1.9°, 2.0°, 2.1°, and 2.5° with respect to the beams of signal light S1 to S4 incident on the plurality of crystal portions 13A to 13D, respectively. Thereby, even when the crystal axis directions of the plurality of crystal portions 13A to 13D are the same as each other, each wavelength component included in the signal light S can be amplified.

Also in such a laser amplification device 1C, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified.

In the laser amplification device 1C, the plurality of beams of signal light S1 to S4 are incident on the plurality of crystal portions 13A to 13D, respectively, at angles equal to each other, and the plurality of beams of excitation light E1 to E4 are incident on the plurality of crystal portions 13A to 13D, respectively, at angles different from each other. By thus dividing signal light S into a plurality of beams, the wavelength width of each beam is moderately narrowed as compared to the case of a single beam having a wide wavelength width and a narrow time width, and excessive narrowing of the time width of each beam can be suppressed. Thereby, the peak intensities of the signal light S and the excitation light E fall within certain ranges, and therefore damage to the elements constituting the optical system can be suppressed.

In the present embodiment, it is sufficient that one of a set of the plurality of beams of signal light S1 to S4 and a set of the plurality of beams of excitation light E1 to E4 be incident on the plurality of crystal portions 13A to 13D, respectively, at angles equal to each other and the other set be incident on the plurality of crystal portions 13A to 13D, respectively, at angles different from each other. Therefore, it is also possible to employ a design in which the plurality of beams of signal light S1 to S4 are incident on the plurality of crystal portions 13A to 13D, respectively, at angles different from each other and the plurality of beams of excitation light E1 to E4 are incident on the plurality of crystal portions 13A to 13D, respectively, at angles equal to each other. In this case, it is preferable that an angle adjustment mechanism that aligns the optical axes of the beams of amplified light A1 to A4 emitted from the nonlinear optical crystal 13 be placed on an optical path between the nonlinear optical crystal 13 and the light condensation unit 4.

Fourth Embodiment

Figure 11:
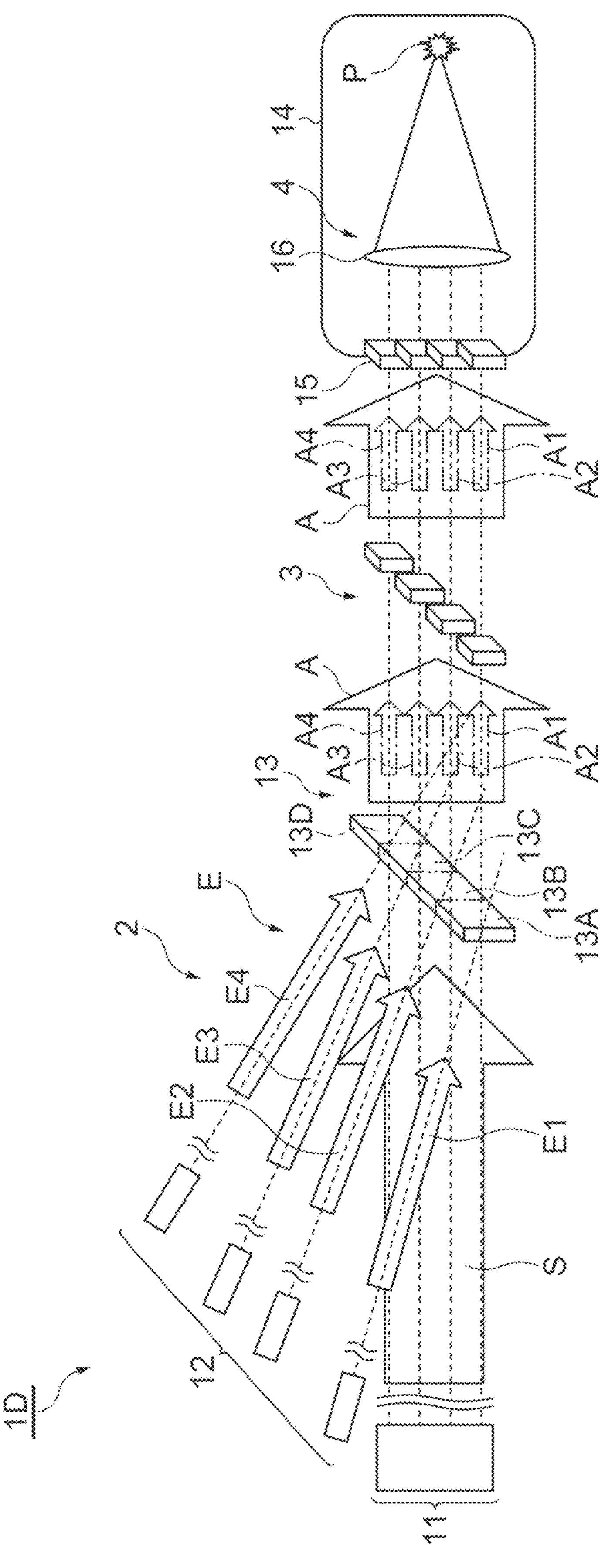
FIG. 11 is a schematic diagram showing a configuration of a laser amplification device according to a fourth embodiment of the present disclosure.

FIG. 11 is a schematic diagram showing a configuration of a laser amplification device according to a fourth embodiment of the present disclosure. As shown in the drawing, a laser amplification device 1D according to the fourth embodiment is different from the third embodiment in that the signal light S is a single beam.

Figure 12:
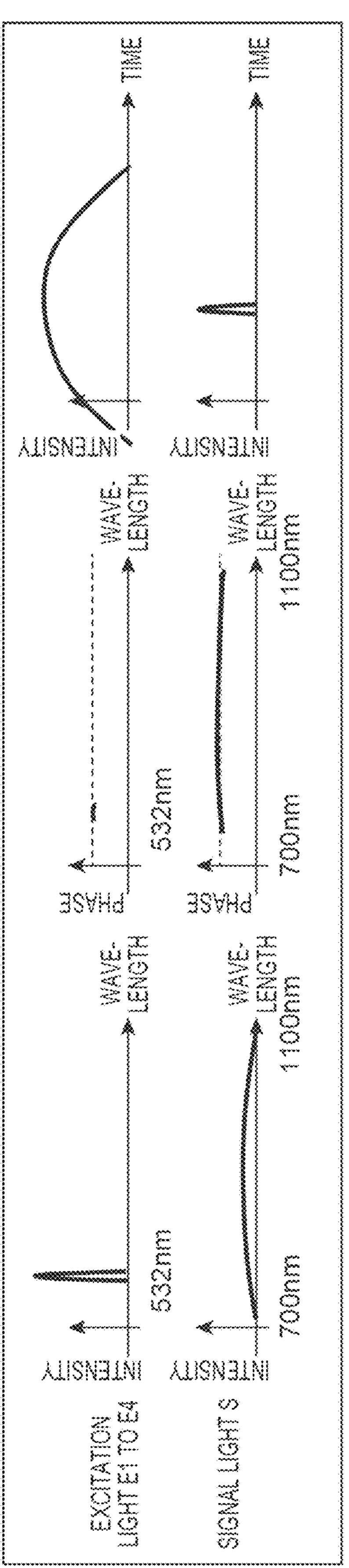
FIG. 12 is a schematic diagram showing a manner of waveforms of the wavelength, the phase, and the time of signal light and excitation light before amplification in the fourth embodiment.

In the laser amplification device 1D, as shown in FIG. 12, the signal light S has a wide wavelength band up to 200 nm or more in a range of 700 nm to 1100 nm, for example. The phase of the signal light S is substantially fixed in each wavelength band. The time width of the signal light S is, for example, in a range of 10 fs to 1 ps, and is inversely proportional to its own wavelength width. Herein, the time width of the signal light S is, for example, 4.5 fs. The waveforms of the wavelength, the phase, and the time of the beams of excitation light E1 to E4 are similar to those of the beams of excitation light E1 to E4 of the first embodiment.

In the laser amplification device 1D, a single beam of signal light S is incident on the plurality of crystal portions 13A to 13D, and a plurality of beams of excitation light E1 to E4 are incident on the plurality of crystal portions 13A to 13D, respectively, at angles different from each other. In the example of FIG. 11, the plurality of beams of excitation light E1 to E4 have angles (angles corresponding to θ2 of FIG. 1) of 1.9°, 2.0°, 2.1°, and 2.5° with respect to the beams of signal light S1 to S4 incident on the plurality of crystal portions 13A to 13D, respectively. Thereby, even when the crystal axis directions of the plurality of crystal portions 13A to 13D are the same as each other, each wavelength component included in the signal light S can be amplified.

In the laser amplification device 1D, since a single beam of signal light S is used, also the amplified light A emitted from the nonlinear optical crystal 13 is apparently a single beam. However, in the plurality of crystal portions 13A to 13D, only the portions of the signal light S that have passed through the incident positions of the beams of excitation light E1 to E4 are amplified, and therefore the actual amplified light A can be regarded as an aggregate of beams of amplified light A1 to A4 emitted from the plurality of spatially different crystal portions 13A to 13D, respectively. The intensity difference between the amplification part and the non-amplification part of the signal light S is, for example, about 1000 times. The phases of the wavelength components of the beams of amplified light A1 to A4 are different from each other (see FIG. 5), but the beams of amplified light A1 to A4 are emitted from the plurality of crystal portions 13A to 13D, respectively, from the nonlinear optical crystal 13 in a spatially separated state.

Also in such a laser amplification device 1D, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified.

In the laser amplification device 1D, since a single beam of signal light S is used for the plurality of crystal portions 13A to 13D, there is no need to use a plurality of signal light sources 11, and the optical system of signal light S can be simplified. Further, the optical axis of signal light S can be easily adjusted. By using a single beam of signal light S, phase adjustment in the phase adjustment unit 3 can be performed with good accuracy. Unlike in the case where a plurality of beams of signal light S are used, a change in optical characteristics due to interference between beams of signal light S can be prevented. Further, utilization efficiency of excitation light E can be sufficiently secured.

Fifth Embodiment

Figure 13:
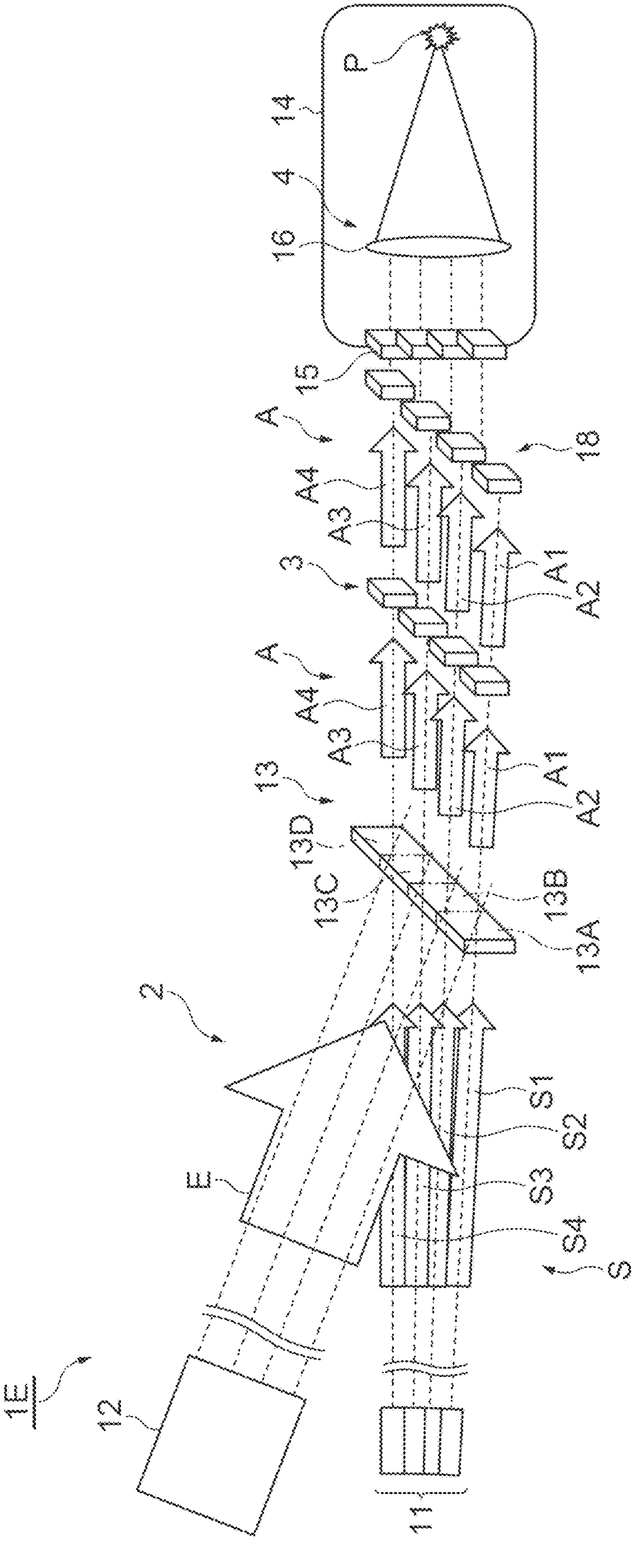
FIG. 13 is a schematic diagram showing a configuration of a laser amplification device according to a fifth embodiment of the present disclosure.

FIG. 13 is a schematic diagram showing a configuration of a laser amplification device according to a fifth embodiment of the present disclosure. As shown in the drawing, a laser amplification device 1E according to the fifth embodiment is different from the third embodiment in that the excitation light E is a single beam.

In the laser amplification device 1E, the waveforms of the wavelength, the phase, and the time of the beams of signal light S1 to S4 are similar to those of the beams of signal light S1 to S4 of the first embodiment (see FIG. 4). The waveforms of the wavelength, the phase, and the time of the excitation light E are similar to those of the excitation light E of the second embodiment (see FIG. 9).

In the laser amplification device 1E, the plurality of beams of signal light S1 to S4 are incident on the plurality of crystal portions 13A to 13D, respectively, at angles different from each other. In the example of FIG. 13, the plurality of beams of signal light S1 to S4 have angles (angles corresponding to θ1 of FIG. 1) of 0°, 0.04°, 0.07°, and 0.1° with respect to the cut angles of the plurality of crystal portions 13A to 13D, respectively. The plurality of beams of signal light S1 to S4 have angles (angles corresponding to θ2 of FIG. 1) of 2.5°, 2.46°, 2.43°, and 2.4° with respect to the excitation light E incident on the plurality of crystal portions 13A to 13D, respectively. Thereby, even when the crystal axis directions of the plurality of crystal portions 13A to 13D are the same as each other, each wavelength component included in the signal light S can be amplified.

Also in such a laser amplification device 1E, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified. In the laser amplification device 1E, since a single beam of excitation light E is used for the plurality of crystal portions 13A to 13D, there is no need to use a plurality of excitation light sources 12, and the optical system of excitation light E can be simplified. Further, the optical axis of excitation light E can be easily adjusted. Unlike in the case where a plurality of beams of excitation light E are used, a change in optical characteristics due to interference between beams of excitation light E can be prevented.

In the laser amplification device 1E, the angles of incidence of the plurality of beams of signal light S1 to S4 on the plurality of crystal portions 13A to 13D are different from each other, and therefore also the directions in which the optical axes of the beams of amplified light A1 to A4 emitted from the nonlinear optical crystal 13 extend are different from each other. Thus, in the laser amplification device 1E, it is preferable that an angle adjustment mechanism 18 that aligns the optical axes of the beams of amplified light A1 to A4 emitted from the nonlinear optical crystal 13 be placed on an optical path between the nonlinear optical crystal 13 and the light condensation unit 4. The angle adjustment mechanism 18 can be formed of, for example, an optical mirror, an electro-optic modulator, an acousto-optic modulator, or the like.

Sixth Embodiment

Figure 14:
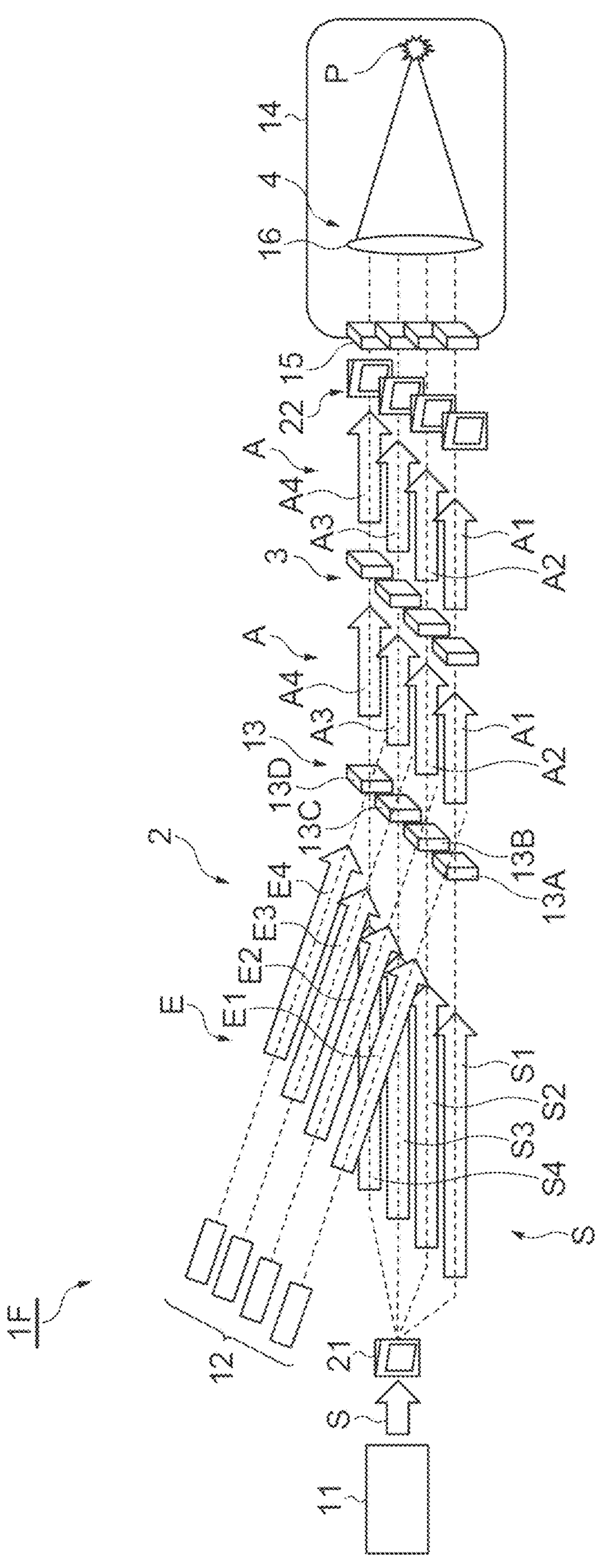
FIG. 14 is a schematic diagram showing a configuration of a laser amplification device according to a sixth embodiment of the present disclosure.

FIG. 14 is a schematic diagram showing a configuration of a laser amplification device according to a sixth embodiment of the present disclosure. As shown in the drawing, a laser amplification device 1F according to the sixth embodiment is different from the first embodiment in that what is called a chirped pulse amplification function is further provided.

More specifically, the laser amplification device 1F further includes a pulse stretcher (stretching unit) 21 and a pulse compressor (compression unit) 22 in addition to the configuration of the laser amplification device 1A. The pulse stretcher 21 is a device that executes a stretching step of giving dispersion to the signal light S to stretch the time width. The pulse stretcher 21 is placed on the side of a stage prior to the nonlinear optical crystal 13. The pulse compressor 22 is a device that executes a compression step of giving inverse dispersion to the amplified light A to compress the time width. The pulse compressor 22 is placed on the side of a stage subsequent to the nonlinear optical crystal 13. In the example of FIG. 14, the pulse stretcher 21 is placed on the optical path of the signal light S between the signal light source 11 and the nonlinear optical crystal 13. The pulse compressor 22 is placed on the optical path of the amplified light A between the phase adjustment unit 3 and the vacuum chamber 14.

Figure 15:
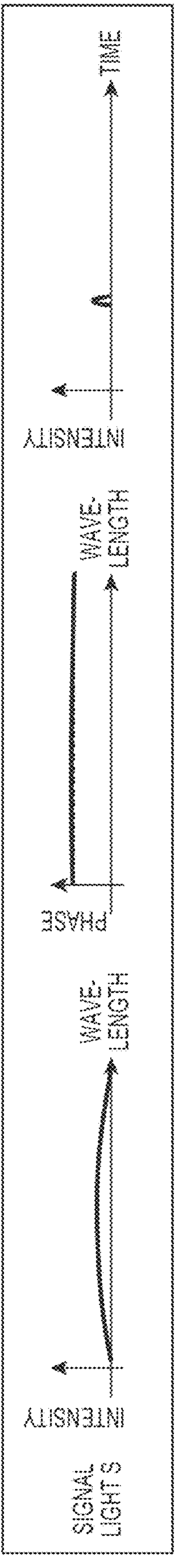
FIG. 15 is a schematic diagram showing a manner of waveforms of the wavelength, the phase, and the time of signal light before stretching in the sixth embodiment.

In the laser amplification device 1F, as shown in FIG. 15, the signal light S before stretching has a wide wavelength band exceeding a range of 700 nm to 1100 nm, for example. The phase of the signal light S is substantially fixed in each wavelength band. The time width of the signal light S is, for example, inversely proportional to the width of each wavelength band in a range of several femtoseconds to 1 picosecond. Herein, the time width of the signal light S is, for example, 4.5 fs. The waveforms of the wavelength, the phase, and the time of the beams of excitation light E1 to E4 are similar to those of the beams of excitation light E1 to E4 of the first embodiment (see FIG. 4).

Figure 16:
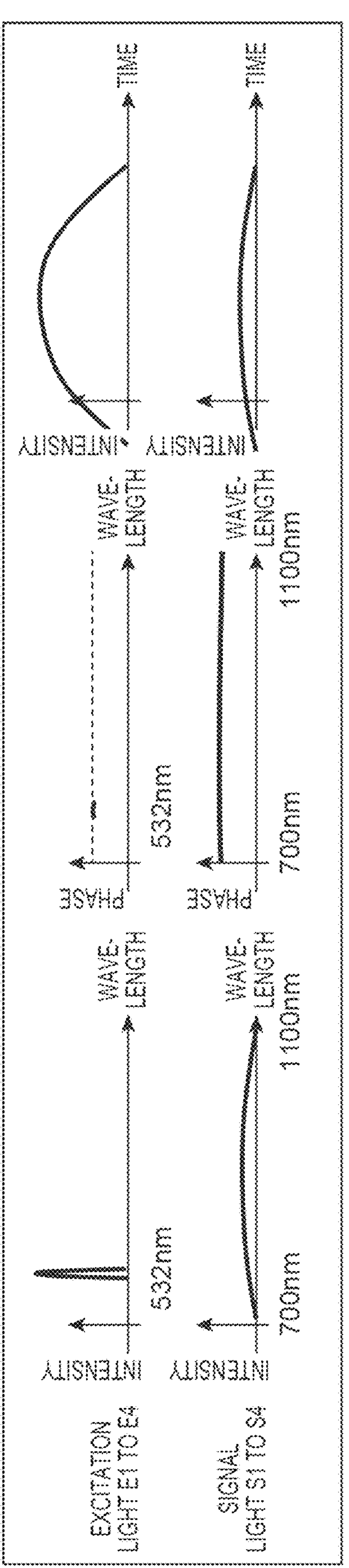
FIG. 16 is a schematic diagram showing a manner of waveforms of the wavelength, the phase, and the time of signal light after stretching in the sixth embodiment.

As shown in FIG. 16, the signal light S after stretching has a time width stretched by the pulse stretcher 21, and is divided into a plurality of beams of signal light S1 to S4 having the same wavelength width. In the beams of signal light S1 to S4, while the wavelength width and the phase are maintained in the state before stretching, the time width is widened to about 10 ps to 1 ns. Herein, the time width of each of the beams of signal light S1 to S4 is, for example, 1 ns.

Figure 17:
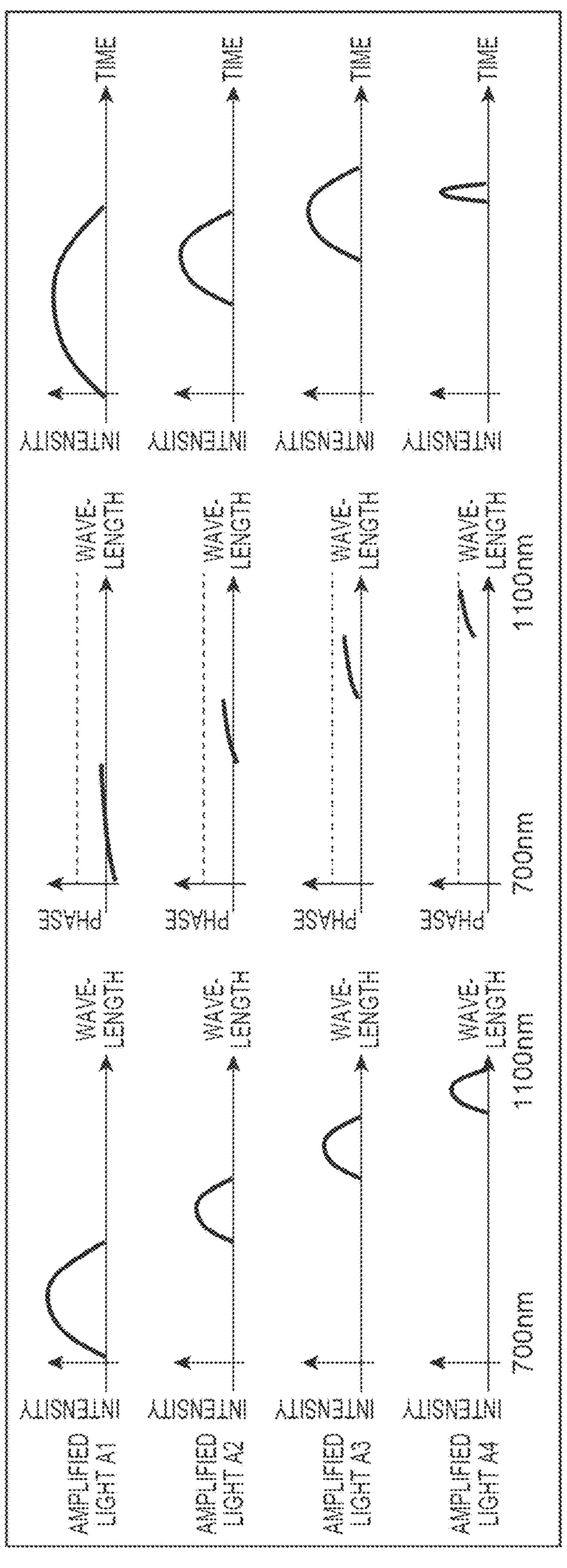
FIG. 17 is a schematic diagram showing a manner of waveforms of the wavelength, the phase, and the time of signal light after amplification in the sixth embodiment.

As shown in FIG. 17, the beams of amplified light A1 to A4 emitted from the nonlinear optical crystal 13 are four beams in which the intensities are increased with respect to the beams of signal light S1 to S4 due to optical parametric amplification and the wavelength widths and the center wavelengths are different from each other. The phase of each wavelength component of the beams of amplified light A1 to A4 is delayed according to the wavelength. The amount of phase delay increases as the wavelength becomes shorter, for example. Hence, the phase of each wavelength component of the beams of amplified light A1 to A4 is shifted according to the wavelength difference. The beams of amplified light A1 to A4 have time widths different from each other according to the wavelength width.

Figure 18:
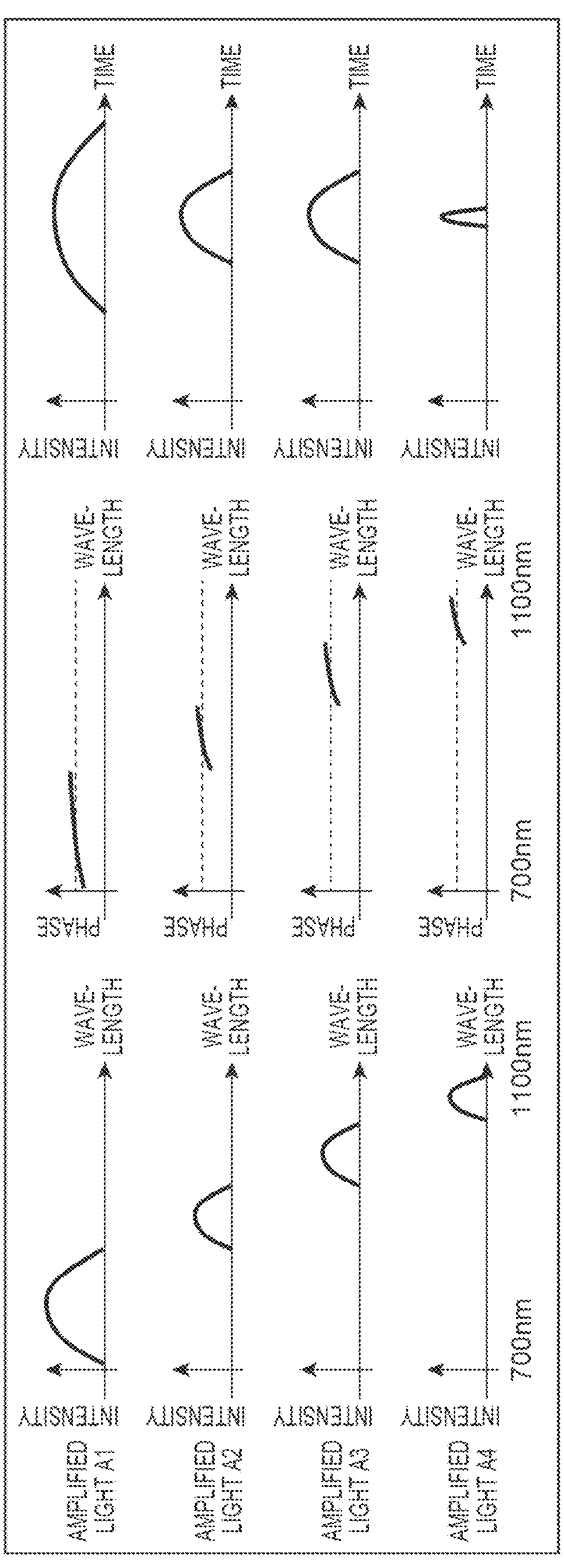
FIG. 18 is a schematic diagram showing a manner of waveforms of the wavelength, the phase, and the time of signal light after phase adjustment in the sixth embodiment.
Figure 19:
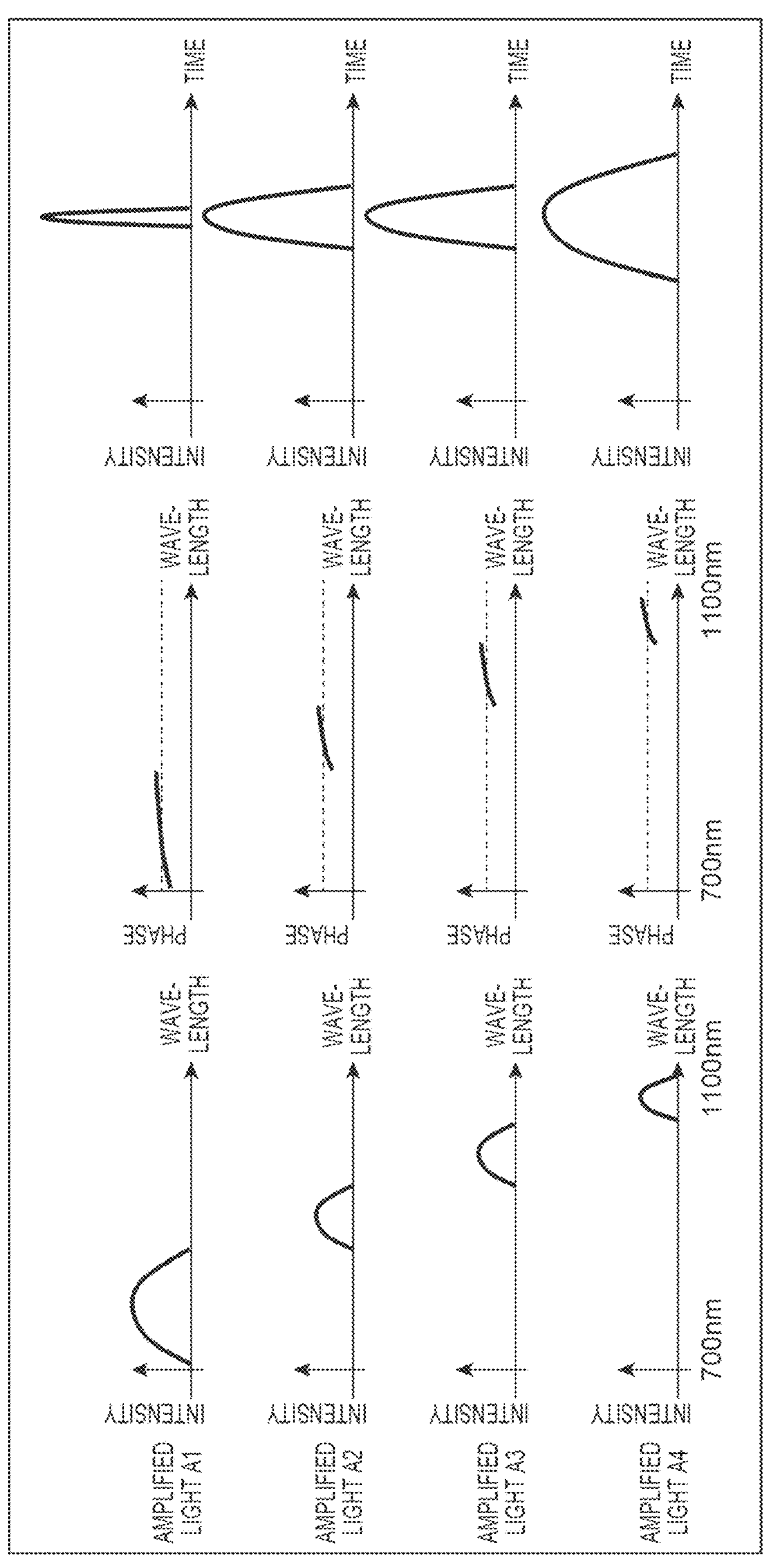
FIG. 19 is a schematic diagram showing a manner of waveforms of the wavelength, the phase, and the time of signal light after compression in the sixth embodiment.
Figure 20:
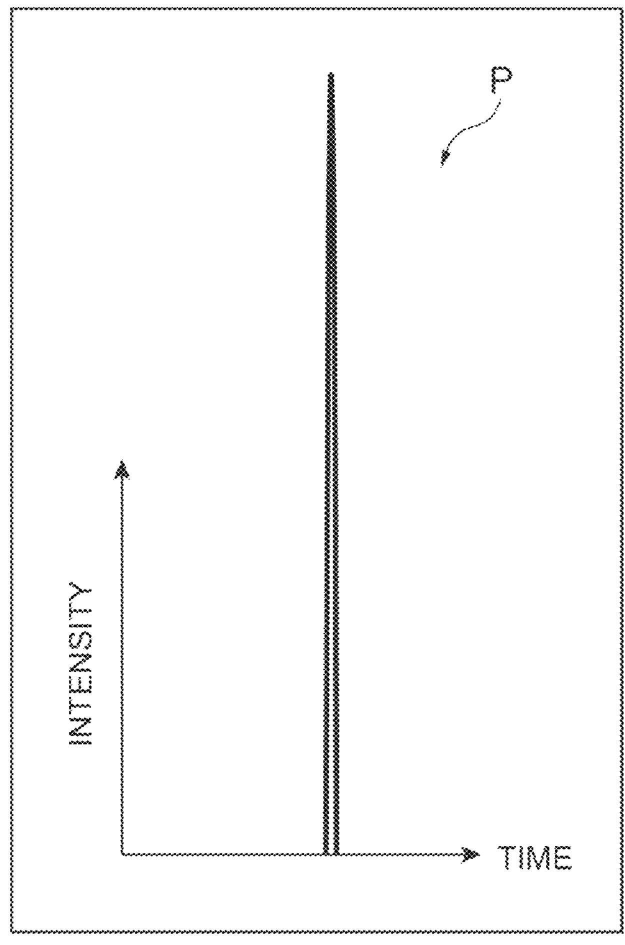
FIG. 20 is a schematic diagram showing a time waveform of ultrashort pulsed light obtained by a light condensation unit in the sixth embodiment.

As shown in FIG. 18, in the beams of amplified light A1 to A4 after phase adjustment, while the intensities before phase adjustment are maintained, the phases of the wavelength components generated at the time of amplification in the nonlinear optical crystal 13 are aligned with each other. As shown in FIG. 19, in the beams of amplified light A1 to A4 after compression, while the wavelength width and the phase are maintained in the state before compression, the time width is narrowed to about 10 fs to 1 ps. Also the beams of amplified light A1 to A4 after compression have time widths different from each other according to the wavelength width. The beams of amplified light A1 to A4 in which the phases of the wavelength components are aligned are condensed by the light condensation unit 4, and thereby high-power ultrashort pulsed light P having a time width (full width at half maximum) of about several femtoseconds to 100 femtoseconds is generated as shown in FIG. 20. The laser amplification device 1F to which chirped pulse amplification is applied can generate ultrashort pulsed light P having a peak intensity higher by about four orders of magnitude than that of the laser amplification device 1A.

Also in such a laser amplification device 1F, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified. In the laser amplification device 1F, ultrashort pulsed light P having high peak intensity can be obtained by using chirped pulse amplification to obtain beams of amplified light A1 to A4 having high energy and after the amplification compressing the time widths of the beams. Since the beams of amplified light A1 to A4 before compression have relatively wide time widths, damage to the elements constituting the optical system can be suppressed.

Seventh Embodiment

Figure 21:
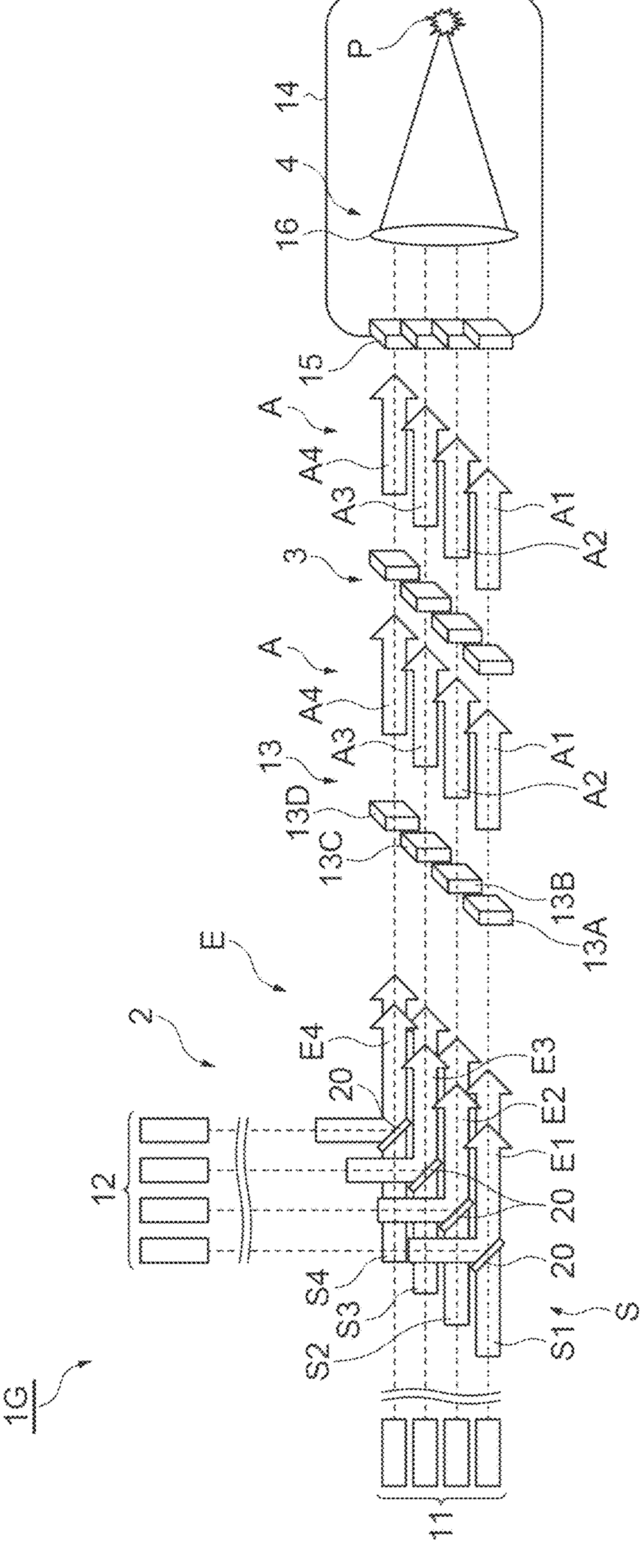
FIG. 21 is a schematic diagram showing a configuration of a laser amplification device according to a seventh embodiment of the present disclosure.

FIG. 21 is a schematic diagram showing a configuration of a laser amplification device according to a seventh embodiment of the present disclosure. As shown in the drawing, a laser amplification device 1G according to the seventh embodiment is different from the first embodiment in that the signal light S and the excitation light E are simultaneously incident on the plurality of crystal portions 13A to 13D from the same direction.

In the example of FIG. 21, a plurality of (four) beams of excitation light E1 to E4 outputted from the excitation light source 12 first travel in a direction orthogonal to the optical axes of the beams of signal light S1 to S4 outputted from the signal light source 11. After that, the beams of excitation light E1 to E4 are multiplexed with the beams of signal light S1 to S4 by beam combining units 20 arranged on the optical axes of the beams of signal light S1 to S4, respectively, and are incident on the nonlinear optical crystal 13 coaxially with the beams of signal light S1 to S4. As the beam combining unit 20, for example, a dichroic mirror can be used.

In the present embodiment, the signal light S and the excitation light E are incident on the nonlinear optical crystal 13 from the same direction. Therefore, the difference in the angle of incidence on the nonlinear optical crystal 13 between the beams of signal light S1 to S4 and the beams of excitation light E1 to E4 (an angle corresponding to θ2 of FIG. 1) is 0°. The cut angles (angles corresponding to θ1 of FIG. 1) of the crystal portions 13A to 13D are 22.98°, 22.94°, 22.90°, and 22.86°, respectively.

Also in such a laser amplification device 1G, similarly to the first embodiment, spatial separation of the wavelength components in the beams of amplified light A1 to A4 is not necessary, and it is not necessary that, for example, an optical component such as a diffraction grating be placed in the optical system; thus, the optical system for increasing the power of ultrashort pulsed light P can be simplified. Further, since portions where the beams of signal light S1 to S4 and the beams of excitation light E1 to E4 are coaxial are formed, the optical system of the device can be downsized.

REFERENCE SIGNS LIST 1A to 1G laser amplification device
2 amplification unit
3 phase adjustment unit
4 light condensation unit
11 signal light source
12 excitation light source
13 nonlinear optical crystal
13A to 13D crystal portion
21 pulse stretcher (stretching unit)
22 pulse compressor (compression unit)
S, S1 to S4 signal light
E, E1 to E4 excitation light
A, A1 to A4 amplified light.

The invention claimed is:

1. A laser amplification device comprising:
an amplifier configured to amplify an intensity of signal light and output amplified light; and
a phase adjuster configured to adjust a phase of each wavelength component included in the signal light or the amplified light,
wherein the amplifier includes: a signal light source configured to output the signal light as pulsed light;
an excitation light source configured to output excitation light as pulsed light; and
a nonlinear optical crystal configured to emit the amplified light by incidence of the signal light and the excitation light,
the nonlinear optical crystal has a plurality of spatially different crystal portions, and
the signal light source, the excitation light source, and the nonlinear optical crystal are arranged such that the signal light and the excitation light are simultaneously incident on the plurality of crystal portions and that elements of at least one of a set of angles of incidence between crystal axes of the plurality of crystal portions and the signal light and a set of angles of incidence between crystal axes of the plurality of crystal portions and the excitation light are different.

2. The laser amplification device according to claim 1, wherein the plurality of crystal portions are arranged in a spatially separated manner.

3. The laser amplification device according to claim 1, wherein the plurality of crystal portions are integrally coupled.

4. The laser amplification device according to claim 1, wherein crystal axis directions of the plurality of crystal portions are different from each other.

5. The laser amplification device according to claim 4, wherein a single beam of the signal light and a single beam of the excitation light are incident on the plurality of crystal portions.

6. The laser amplification device according to claim 4, wherein a plurality of beams of the signal light are incident on the plurality of crystal portions at angles equal to each other, and a plurality of beams of the excitation light are incident on the plurality of crystal portions at angles equal to each other.

7. The laser amplification device according to claim 1, wherein crystal axis directions of the plurality of crystal portions are the same as each other.

8. The laser amplification device according to claim 7, wherein a single beam of the signal light is incident on the plurality of crystal portions, and a plurality of beams of the excitation light are incident on the plurality of crystal portions at angles different from each other.

9. The laser amplification device according to claim 7, wherein a plurality of beams of the signal light are incident on the plurality of crystal portions at angles different from each other, and a single beam of the excitation light is incident on the plurality of crystal portions.

10. The laser amplification device according to claim 7, wherein one of a set of a plurality of beams of the signal light and a set of a plurality of beams of the excitation light is incident on the plurality of crystal portions at angles equal to each other, and another set is incident on the plurality of crystal portions at angles different from each other.

11. The laser amplification device according to claim 1, further comprising a light condensation unit configured to condense the amplified light in which a phase of each wavelength component is adjusted by the phase adjuster.

12. The laser amplification device according to claim 1, further comprising:

a stretcher configured to give dispersion to the signal light to stretch a time width in a stage prior to the nonlinear optical crystal; and a compressor configured to give inverse dispersion to the amplified light to compress a time width in a stage subsequent to the nonlinear optical crystal.

13. A laser amplification method comprising:

amplifying an intensity of signal light and outputting amplified light by causing the signal light and excitation light to be incident on a nonlinear optical crystal, the signal light being pulsed light and the excitation light being pulsed light; and adjusting a phase of each wavelength component included in the signal light or the amplified light, wherein in the amplifying, the signal light and the excitation light are simultaneously caused to be incident on a plurality of spatially different crystal portions in the nonlinear optical crystal in a state where elements of at least one of a set of angles of incidence between crystal axes of the plurality of crystal portions and the signal light and a set of angles of incidence between crystal axes of the plurality of crystal portions and the excitation light are set different.

14. The laser amplification method according to claim 13, wherein in the amplifying, the plurality of crystal portions are arranged in a spatially separated manner.

15. The laser amplification method according to claim 13, wherein in the amplifying, the plurality of crystal portions are arranged in an integrally coupled manner.

16. The laser amplification method according to claim 13, wherein in the amplifying, crystal axis directions of the plurality of crystal portions are set different from each other.

17. The laser amplification method according to claim 16, wherein in the amplifying, a single beam of the signal light and a single beam of the excitation light are caused to be incident on the plurality of crystal portions.

18. The laser amplification method according to claim 16, wherein in the amplifying, a plurality of beams of the signal light are caused to be incident on the plurality of crystal portions at angles equal to each other, and a plurality of beams of the excitation light are caused to be incident on the plurality of crystal portions at angles equal to each other.

19. The laser amplification method according to claim 13, wherein in the amplifying, crystal axis directions of the plurality of crystal portions are set the same as each other.

20. The laser amplification method according to claim 19, wherein in the amplifying, a single beam of the signal light is caused to be incident on the plurality of crystal portions, and a plurality of beams of the excitation light are caused to be incident on the plurality of crystal portions at angles different from each other.

21. The laser amplification method according to claim 19, wherein in the amplifying, a plurality of beams of the signal light are caused to be incident on the plurality of crystal portions at angles different from each other, and a single beam of the excitation light is caused to be incident on the plurality of crystal portions.

22. The laser amplification method according to claim 19, wherein in the amplifying, one of a set of a plurality of beams of the signal light and a set of a plurality of beams of the excitation light is caused to be incident on the plurality of crystal portions at angles equal to each other, and another set is caused to be incident on the plurality of crystal portions at angles different from each other.

23. The laser amplification method according to claim 13, further comprising condensing the amplified light in which a phase of each wavelength component is adjusted by the adjusting.

24. The laser amplification method according to claim 13, further comprising:

stretching giving dispersion to the signal light to stretch a time width prior to the amplifying; and compressing giving inverse dispersion to the amplified light to compress a time width subsequent to the amplifying.

* * * * *